United States Patent
Kang et al.

(10) Patent No.: US 9,654,969 B2
(45) Date of Patent: *May 16, 2017

(54) METHOD AND DEVICE FOR MANAGING SECURITY KEY FOR COMMUNICATION AUTHENTICATION OF SUBSCRIBER STATION USED IN COOPERATIVE COMMUNICATION OF MULTIPLE BASE STATION IN RADIO COMMUNICATION SYSTEM

(71) Applicant: Samsung Electronics Co., Ltd, Gyeonggi-do (KR)

(72) Inventors: Hyun-Jeong Kang, Seoul (KR); Jung-Shin Park, Seoul (KR); Dae-Gyun Kim, Gyeonggi-do (KR); Jung-Soo Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

This patent is subject to a terminal disclaimer.

(21) Appl. No.: 14/063,949

(22) Filed: Oct. 25, 2013

(65) Prior Publication Data
US 2014/0120874 A1    May 1, 2014

(30) Foreign Application Priority Data
Oct. 25, 2012  (KR) .................. 10-2012-0119319

(51) Int. Cl.
*H04M 1/66* (2006.01)
*H04W 12/04* (2009.01)
(Continued)

(52) U.S. Cl.
CPC ............ *H04W 12/04* (2013.01); *H04W 12/02* (2013.01); *H04W 12/06* (2013.01); *H04W 36/08* (2013.01)

(58) Field of Classification Search
CPC .............................. H04W 12/04; H04W 12/06
(Continued)

(56) References Cited

U.S. PATENT DOCUMENTS

| 6,370,380 B1 * | 4/2002 | Norefors | ............... H04L 63/126 |
| | | | 370/331 |
| 6,377,805 B1 * | 4/2002 | Anvekar | ............... H04W 36/08 |
| | | | 455/11.1 |

(Continued)

FOREIGN PATENT DOCUMENTS

| KR | 10-2008-0053177 | 6/2008 |
| KR | 10-2011-0021983 | 3/2011 |
| WO | WO 2007/120024 | 10/2007 |

OTHER PUBLICATIONS

International Search Report dated Jan. 29, 2014 in connection with International Patent Application No. PCT/KR2013/009585, 3 pages.

(Continued)

*Primary Examiner* — Charles Shedrick

(57) ABSTRACT

A subscriber station performs a method for managing a security key. The method includes generating, for each of the base stations, an input value for generation of the security key for data transmission and reception with the each base station; transmitting, to the each base station, the input value for a corresponding base station; and generating the security key of the corresponding base station by using the input value of the each base station. A base station provides cooperative communication to the subscriber station.

22 Claims, 24 Drawing Sheets

(51) Int. Cl.
*H04W 12/06* (2009.01)
*H04W 12/02* (2009.01)
*H04W 36/08* (2009.01)

(58) Field of Classification Search
USPC .............. 455/436, 411, 442; 380/270, 272, 380/259–260, 262, 277–286, 44; 370/331; 713/153, 169, 171
See application file for complete search history.

(56) References Cited

U.S. PATENT DOCUMENTS

| | | | |
|---|---|---|---|
| 6,847,826 B1* | 1/2005 | Wesby | H04J 3/0652 455/502 |
| 6,879,830 B1* | 4/2005 | Vollmer | H04W 36/0055 370/331 |
| 8,046,583 B2* | 10/2011 | Taniguchi | H04W 12/02 380/270 |
| 8,245,028 B2* | 8/2012 | Calcev | H04L 63/045 713/153 |
| 8,397,071 B2 | 3/2013 | Cho et al. | |
| 8,630,415 B2* | 1/2014 | Pourzandi | G06F 9/468 380/255 |
| 8,792,464 B2* | 7/2014 | Voglewede | G01S 5/0294 370/330 |
| 2003/0035542 A1* | 2/2003 | Kim | H04L 1/14 380/270 |
| 2003/0054767 A1* | 3/2003 | Mandhyan | H04M 1/725 455/41.1 |
| 2003/0219129 A1* | 11/2003 | Whelan | H04L 9/0891 380/270 |
| 2006/0251006 A1* | 11/2006 | Oliver | H04W 16/14 370/328 |
| 2007/0224993 A1* | 9/2007 | Forsberg | H04L 9/0844 455/436 |
| 2007/0233860 A1* | 10/2007 | Lillie | H04L 63/061 709/225 |
| 2007/0297611 A1* | 12/2007 | Yun | H04L 63/061 380/270 |
| 2008/0070577 A1* | 3/2008 | Narayanan | H04L 63/062 455/436 |
| 2008/0130902 A1* | 6/2008 | Foo Kune | H04L 63/062 380/286 |
| 2008/0162939 A1* | 7/2008 | Lee | H04L 63/083 713/171 |
| 2008/0167003 A1* | 7/2008 | Wang | H04W 8/20 455/411 |
| 2008/0240072 A1* | 10/2008 | Bykovnikov | H04B 7/269 370/350 |
| 2008/0267407 A1* | 10/2008 | Vanderveen | H04L 9/083 380/277 |
| 2008/0279158 A1* | 11/2008 | Schmidt | H04L 63/0428 370/338 |
| 2009/0024848 A1* | 1/2009 | Takasugi | H04L 9/3236 713/169 |
| 2009/0274302 A1* | 11/2009 | Wu | H04L 63/06 380/272 |
| 2009/0296934 A1 | 12/2009 | Qing et al. | |
| 2010/0002883 A1* | 1/2010 | Sammour | H04L 63/1416 380/272 |
| 2010/0173610 A1* | 7/2010 | Kitazoe | H04W 36/0038 455/411 |
| 2010/0205442 A1 | 8/2010 | Han et al. | |
| 2010/0278343 A1* | 11/2010 | Goto | H04L 63/061 380/270 |
| 2010/0316221 A1* | 12/2010 | Tie | H04L 9/0822 380/270 |
| 2011/0004760 A1 | 1/2011 | Sharaga et al. | |
| 2011/0249651 A1* | 10/2011 | Kang | H04W 36/0033 370/331 |
| 2011/0268274 A1* | 11/2011 | Qiu | H04L 9/0844 380/270 |
| 2012/0046066 A1* | 2/2012 | Tamura | H04L 1/0029 455/525 |
| 2012/0163600 A1* | 6/2012 | Kim | H04L 63/065 380/270 |
| 2014/0120874 A1* | 5/2014 | Kang | H04W 12/04 455/411 |

OTHER PUBLICATIONS

Written Opinion of the International Searching Authority dated Jan. 29, 2014 in connection with International Patent Application No. PCT/KR2013/009585, 5 pages.
Youngbok Cho, et al., "An Identification based Authentication Protocol for Secure Data Transmission in Ad-Hoc Networks", International Journal of Future Generation Communication and Networking, vol. 5, No. 2, Jun. 2012, pp. 107-120.
Tanveer Zia, et al., "A Secure Triple-Key Management Scheme for Wireless Sensor Networks", IEEE, 2006, 2 pages.
Extended European Search Report issued for EP 13848740.0 dated Mar. 7, 2016, 7 pgs.

* cited by examiner

METHOD AND DEVICE FOR MANAGING SECURITY KEY FOR COMMUNICATION AUTHENTICATION OF SUBSCRIBER STATION USED IN COOPERATIVE COMMUNICATION OF MULTIPLE BASE STATION IN RADIO COMMUNICATION SYSTEM

CROSS-REFERENCE TO RELATED APPLICATION(S) AND CLAIM OF PRIORITY

The present application is related to and claims priority under 35 U.S.C. §119(a) to Korean Application Serial No. 10-2012-0119319, which was filed in the Korean Intellectual Property Office on Oct. 25, 2012, the entire content of which is hereby incorporated by reference.

TECHNICAL FIELD

The present disclosure relates to a method and a device for managing a security key for communication authentication of a subscriber station in cooperative communication of multiple base stations which perform data transmission and reception with one or more base stations in a radio communication system.

BACKGROUND

As a next-generation wireless communication system, a wireless communication system that uses a high frequency band such as millimeter waves (mmW) is considered to support high capacity data services. Since the communication distance between a subscriber station and a base station is reduced in a system using a high frequency band, the cell radius of a base station becomes smaller. Accordingly, the number of base stations installed to secure a service area of a subscriber station increases. Further, considering the mobility of a subscriber station, if the cell radius of base stations decreases and the number of the base stations increase, then the number of handovers between cells of the subscriber stations and the overhead of the system also increases, due to the handover of the subscriber station.

In a wireless communication system using a high frequency band, since the number of base stations per unit area increases, serving base stations communicating with a subscriber station are frequently changed during the movement of the subscriber station, and verification procedures for creating and allocating verification keys and security keys for transmitting and receiving data between the changed base station and the subscriber terminal are required whenever the serving base stations are changed.

Thus, a measure for efficiently performing a verification procedure is required in a wireless communication system using a high frequency band. In particular, in understanding the operation of servicing a subscriber station in order to minimize the overhead of changing base stations in a wireless communication system through the cooperation of many base stations around the terminal, efficiently performing a verification procedure and security key management necessary for performing cooperation communications with at least one of the base stations is required.

SUMMARY

To address the above-discussed deficiencies, it is a primary object to provide a method and a device for managing a security key for communication authentication of a subscriber station in the cooperative communication of multiple base stations which perform data transmission and reception with one or more base stations.

In accordance with an aspect of the present disclosure, a method of managing a security key in a cell configured with base stations that provide cooperative communication to a subscriber station is provided. The method includes: generating, for each of the base stations, an input value for generation of the security key for data transmission and reception with the base station; transmitting, to the base station, the input value for the corresponding base station; and generating the security key of the corresponding base station by using the input value of the base station.

In accordance with another aspect of the present disclosure, a method of managing a security key of a serving base station in a cell configured with base stations that provide cooperative communication to a subscriber station is provided. The method includes: receiving, from the subscriber station, an input value for generation of a security key for data transmission and reception with base stations; and generating the security key by using the input value.

In accordance with another aspect of the present disclosure, a subscriber station for managing a security key in a cell configured with base stations that provide cooperative communication to the subscriber station is provided. The subscriber station includes: a security key generating unit that generates, for each of the base stations, an input value for generation of the security key for data transmission and reception with the base station, and generates the security key of the corresponding base station by using the input value of the base station; and a transmission and reception unit that transmits, to the base station, the input value for the corresponding base station.

In accordance with another aspect of the present disclosure, a base station for providing cooperative communication to a subscriber station is provided. The base station includes: a transmission and reception unit that receives, from the subscriber station, an input value for the generation of a security key for data transmission and reception with base stations; and a security key generating unit that generates the security key by using the input value.

As described above, according to the embodiments of the present disclosure, in cooperative communication of multiple base stations which perform data transmission and reception between a single subscriber station and one or more base stations, a security key for authentication and data encryption for communication of the subscriber station is managed for one or more base stations, thereby providing reliable and flawless communication between the subscriber station and the several base stations servicing the subscriber station.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, various example embodiments of the present disclosure will be described in detail with reference to the accompanying drawings. In the following description of the present disclosure, a detailed description of known functions and configurations incorporated herein will be omitted when it may make the subject matter of the present disclosure rather unclear. The terms which will be described below are terms defined in consideration of the functions in the present disclosure, and may be different according to users, intentions of the users, or customs. Therefore, its definition will be made based on the overall contents of this specification.

In the embodiments of the present disclosure, an authentication procedure for data transmission and reception is proposed in a radio communication system in which a plurality of base stations provide a communication service (hereinafter, referred to as 'cooperative communication') to a subscriber station through cooperation thereof. In order to help comprehension of the present disclosure, an authentication procedure for data transmission and reception performed in a general radio communication system will first be described, and then the authentication procedure performed in the radio communication system, which provides the cooperative communication according to the embodiments of the present disclosure, will be described.

Figure 1:
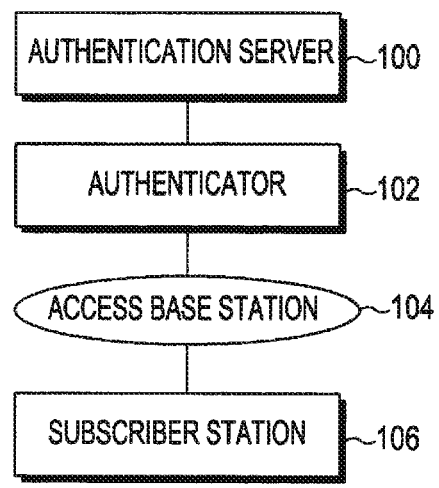
FIG. 1 is a block diagram illustrating a general radio communication system that performs authentication and data encryption of a subscriber station.

FIG. 1 is a block diagram illustrating a general radio communication system that performs authentication and data encryption of a subscriber station.

Referring to FIG. 1, the general radio communication system includes a subscriber station 106, an access base station 104, an access service network gateway 102 (hereinafter, referred to as 'an authenticator'), and an authentication server 100 (Authentication, Authorization and Accounting (AAA)).

Referring to FIG. 1, the subscriber station 106 receives a service, which an access service network provides, through the access base station 104. The access base station 104 controls radio resources of the subscriber station 106, and provides a wireless access point associated with communication of the subscriber station 106.

The authenticator 102 manages authentication for data to transmit/receive to/from the subscriber station 106, and a security key for data encryption. The authenticator 102 controls an operation of the access service network for the subscriber station 106, and functions as a paging control station that manages an idle mode operation of the subscriber station 106. The authentication server 100 provides an access network authentication service of the subscriber station 106.

As illustrated in FIG. 1, the general radio communication system manages the security key for the authentication and the data encryption according to a scenario in which the single subscriber station receives a data service through the single access base station.

In embodiments of the present disclosure, a method of managing a security key for authentication and data encryption is described for a radio communication system in which a plurality of base stations provide cooperative communication to a subscriber station through cooperation thereof, and which performs data transmission and reception with the plurality of base stations that provide the cooperative communication, and the subscriber station.

Hereinafter, considering the characteristics of a high frequency band to be used in the radio communication system that provides the cooperative communication, a method for providing a more efficient service to a user, to which the present disclosure is applied, will be described. The radio communication system that provides the cooperative communication, defined in the present disclosure, includes a plurality of base stations around a single subscriber station which provide a service to the subscriber station, and it is assumed that the radio communication system operates in millimeter Wave (mmW) bands for providing a broadband service or in a general cellular band of 1 GHz or lower, 1.8 GHz to 2.5 GHz, or 3.5 GHz to 3.6 GHz.

Figure 2A:
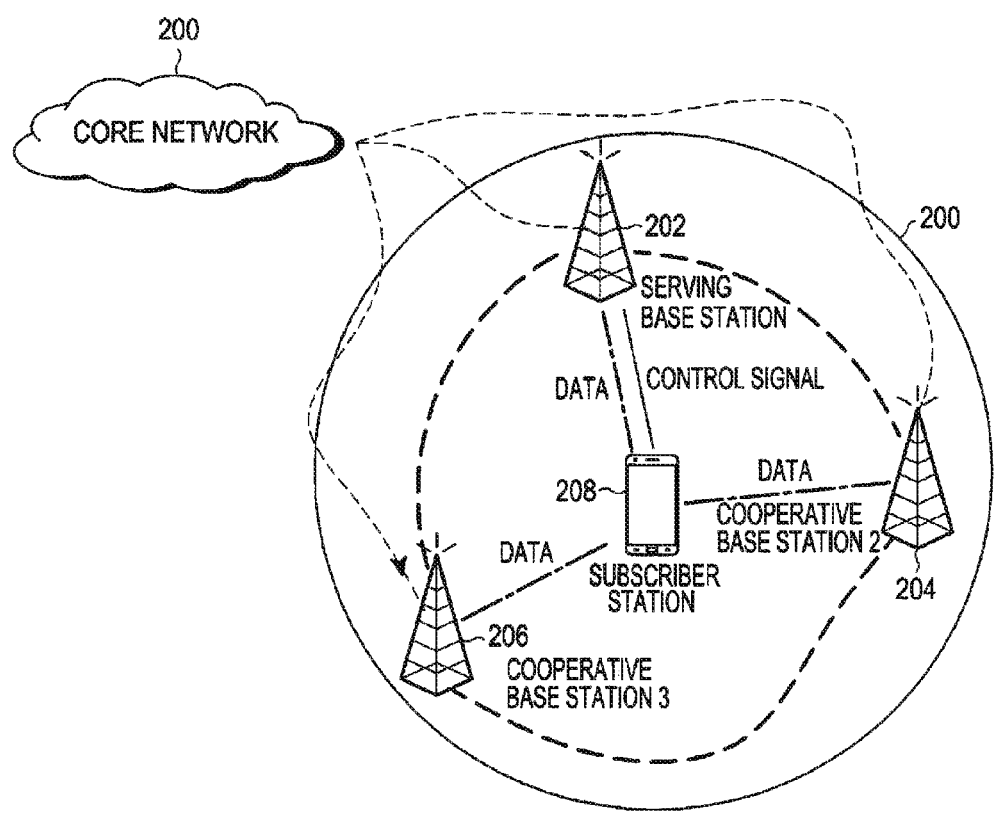
FIG. 2A is a diagram illustrating an example of a radio communication system that provides cooperative communication according to an embodiment of the present disclosure.

FIG. 2A is a diagram illustrating an example of a radio communication system that provides cooperative communication according to an embodiment of the present disclosure.

Referring to FIG. 2A, for convenience of description, it is assumed, for example, that a cell 200 that provides cooperative communication includes a subscriber station 208 and three cooperative base stations 202, 204, and 206 that transmit data to the subscriber station 208. The number of the base stations configuring the radio communication system is illustrative and may be varied.

The serving base station 202 may transmit both a control signal and data to the subscriber station 208, and manage the remaining cooperative base stations 2 and 3 (204 and 206). The cooperative base stations 2 and 3 (204 and 206) may transmit only data to the subscriber station 208 when not receiving a specific instruction from the serving base station 202. At this time, the data which the serving base station 202 transmits to the subscriber station 208 may be the same as or different from the data which the cooperative base stations 2 and 3 (204 and 206) transmit to the subscriber station 208.

The serving base station 202 and the cooperative base stations 2 and 3 (204 and 206) may be directly connected with a core network 210, and may be directly connected with each other in a wireless or wired manner.

All of the serving base station 202 and the cooperative base stations 2 and 3 (204 and 206) may serve the subscriber station 208, thereby increasing reliability of links that provide a relatively low communication quality, and may provide to the subscriber station 208 a plurality of links that provide a higher communication quality, thereby increasing a throughput.

Within the cell 200, the serving base station 202 and the cooperative base stations 2 and 3 (204 and 206) may transmit data to the subscriber station 208 at the same time or at different times. In the same way, the subscriber station 208 may transmit data to the serving base station 202 and the cooperative base stations 2 and 3 (204 and 206) at the same time or at different times. To this end, the subscriber station 208 may include multiple Radio Frequency (RF) chains.

In the above-described radio communication system that provides the cooperative communication, the subscriber station transmits/receives the data to/from several base stations belonging to the cell that provides the cooperative communication, so that a hand-over operation is not required in the general radio communication system, when the subscriber station is moved in the base stations belonging to the cell. Thus, boundless mobility of the corresponding subscriber station can be managed in the cell-based radio communication system that provides cooperative communication according to the embodiment of the present disclosure.

In the embodiment of the present disclosure, the subscriber station manages a security key, including an authentication key and a data encryption key, for authentication and data encryption for the several base stations, in order to transmit/receive the data to/from the several base stations belonging to the cell that provides the cooperative communication.

Figure 2B:
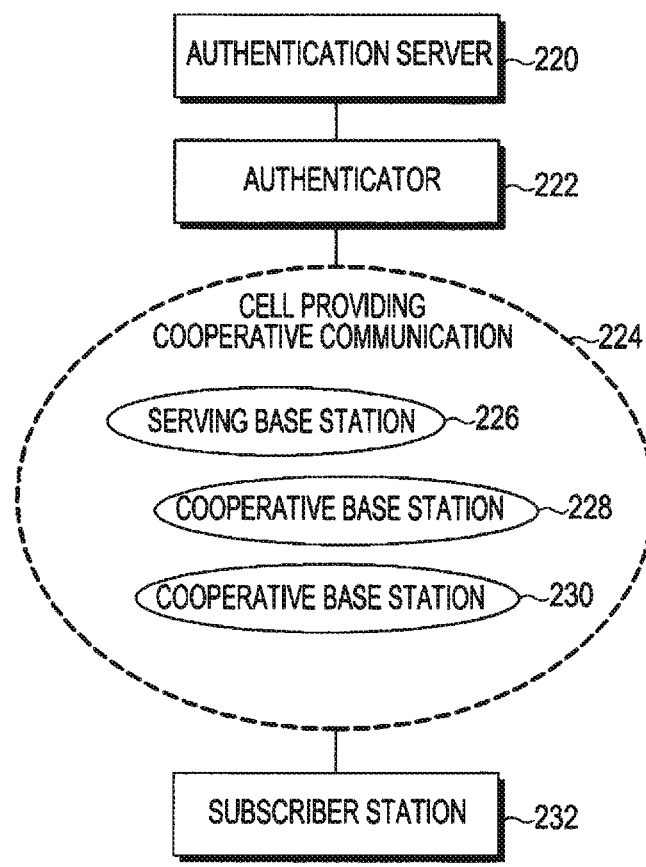
FIG. 2B is a block diagram illustrating a radio communication system that performs an authentication procedure such as authentication and data encryption of a subscriber station in a cell that provides cooperative communication according to an embodiment of the present disclosure.

FIG. 2B is a block diagram illustrating a radio communication system that performs an authentication procedure such as authentication and data encryption of a subscriber station in a cell that provides cooperative communication according to an embodiment of the present disclosure.

Referring to FIG. 2B, the cell-based radio communication system that provides the cooperative communication includes a subscriber station 232, an authenticator 222, and an authentication server 220. In FIG. 2B, the authenticator 222 and the authentication server 220 are separated, but may be configured as a single block.

A cell 224 that provides cooperative communication includes a serving base station 226 that provides a wireless access point of an access service network to the subscriber station 232, and cooperative base stations 228 and 230. The serving base station 226 controls the cooperative base stations 228 and 230 belonging to the cell 224 to provide a data service to the subscriber station 232. The cooperative base stations 228 and 239 transmit/receive data to/from the subscriber station 232 in the cell 224 under the control of the serving base station 226. The authenticator 222 performs an authentication procedure of managing a security key for authentication and data encryption of data of the subscriber station 232. The authenticator 222 controls an operation of an access service network of the subscriber station 232, and functions as a paging control station that manages an idle mode operation of the subscriber station 232. The authentication server 220 provides an access network authentication service of the subscriber station 232.

—First Embodiment—

In a first embodiment of the present disclosure, a subscriber station generates, for respective member base stations that configure a cell that provides cooperative communication thereto, seeds input when creating a security key (hereinafter, referred to as 'a security key for cooperative communication') for encryption of data transmitted/received during communication within the cell. The generated seeds for the member base stations have different values. The subscriber station transfers the generated seeds to the corresponding member base stations. Then, a serving base station and cooperative base stations, which configure the cell that provides the cooperative communication, generate security keys for cooperative communication thereof, by using the seed received from the subscriber station. At this time, since data transmission/reception in the cell that provides the cooperative communication is performed under control of the serving base station, data encrypted with the security key for the cooperative communication is transmitted and received. The security keys of the cooperative base stations for the cooperative communication are preparatory security keys (hereinafter, referred to as 'a security key for sub-cooperative communication') that will be used when the corresponding cooperative base station is changed to the serving base station of the cell. Thus, in preparation for the case of being changed to the serving base station, the cooperative base stations according to the first embodiment of the present disclosure store the security key for the sub-cooperative communication. Even when a new member base station is added to the cell, the subscriber station generates a seed for the newly added member base station, which is different from those of the other member base stations, and transfers the seed to the new member base station. The subscriber station and the new member base station generate a security key for sub-cooperative communication, which will be used when the new member base station is changed to the serving base station, by using the seed.

Figure 3:
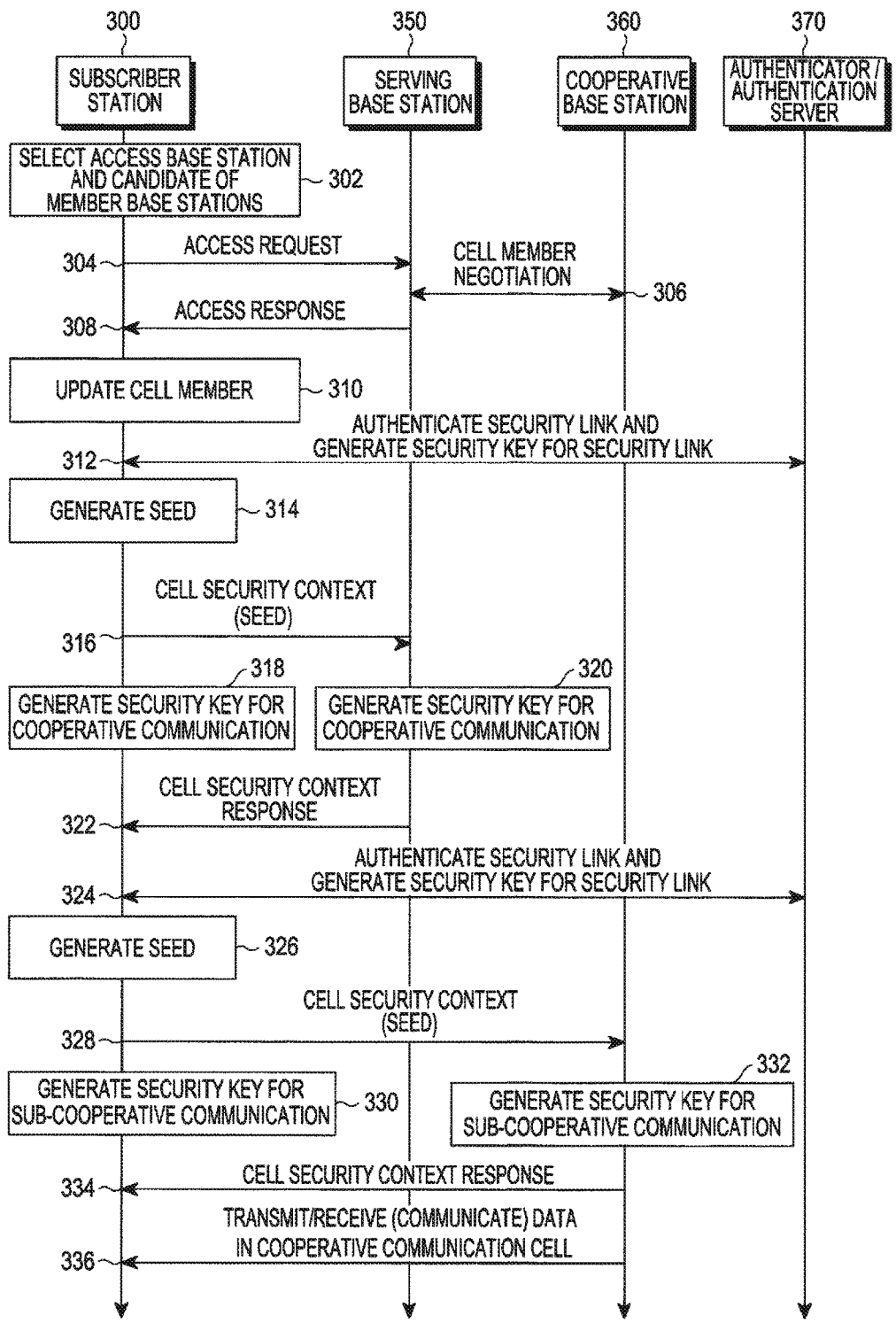
FIG. 3 is a signal flow diagram illustrating a procedure for managing a security key of a subscriber station in a process of configuring a cell that provides cooperative communication according to a first embodiment of the present disclosure.

FIG. 3 is a signal flow diagram illustrating a procedure for managing a security key of a subscriber station in a process of configuring a cell that provides cooperative communication according to a first embodiment of the present disclosure.

Referring to FIG. 3, in operation 302, a subscriber station 300 selects an access base station to access and a candidate of a member base station (referred to as 'a candidate base station') configuring a cell that provides cooperative communication. Suppose the subscriber station 300 selects a serving base station 350 as the access base station, and a cooperative base station 360 as the candidate base station. In operation 304, the subscriber station 300 transmits an access request signal to the serving base station 350. The access request signal may include information from the candidate base station which the subscriber station 300 has selected. That is, when the access request includes the information of the candidate base station, i.e., the cooperative base station 360, the serving base station 350 performs a cell member negotiation procedure for cooperative communication with the cooperative base station 360, in operation 306. The serving base station 350 transmits an access response signal for the access request signal to the subscriber station 300, in operation 308. The access response signal includes a result of the cell member negotiation procedure, i.e., the information on the cooperative base station 360. In operation 310, the subscriber station 300 adds the cooperative base station 360 to a cell member base station list stored in the subscriber station 300 to update a cell member.

Thereafter, in operation 312, the subscriber station 300 generates a secure link with the serving base station 360, and generates, under participation of a authenticator/authentication server 370, a security key (hereinafter, referred to as 'a security key for a security link') for authenticating and encrypting the security link generated between the subscriber station 300 and the serving base station 350.

In operation 314, the subscriber station 300 generates a seed for the serving base station 350 to configure a security key (hereinafter referred to as 'a security key for cooperative communication') which the serving base station 360 is to use for communication in the cell that provides the cooperative communication. The seed, according to the first embodiment of the present disclosure, is a value that is arbitrarily generated in the subscriber station 300 such that the member base stations configuring the cell of the subscriber station 300 that provides the cooperative communication use different values, respectively. In operation 316, the subscriber station 300 transfers a cell security context including the seed to the serving base station 350. The seed is transferred through the security link which is generated in operation 312. In operations 318 and 320, the subscriber station 300 and the serving base station 350 configure the security key for the cooperative communication, which is to be used for the communication in the cell, by using the seed. The security key for the cooperative communication is configured through Equation 1 or Equation 2 below.

$$\text{Security key for cooperative communication} = \text{Dot16KDF}(AK\_BS, MSID|seed|\text{"cell key"}, cell\_key\_length) \quad \text{[Equation 1]}$$

$$\text{Security key for cooperative communication} = \text{Dot16KDF}(PMK, AK\_BS|MSID|seed\ 1\text{"cell key"}, cell\_key\_length) \quad \text{[Equation 2]}$$

Here, PMK denotes a pairwise master key that is an example of a master key, AK_BS is an authentication key (AK) for a corresponding base station, MSID (Mobile Station IDentifier) denotes a subscriber station identifier, seed denotes a seed generated by the subscriber station, "cell key" is a character string denoting an encryption key for cooperative communication, and Dot16KDF is an algorithm for generating an authentication key of cell_key_length bits through an input of PMK, AK_BS, subscriber station identifier, seed, and "cell key" character string, or AK_BS, subscriber station identifier, seed, and "cell key" character string.

The seed is used as an input value for generating an authentication key that the subscriber station 300 will use for all data transmission/reception in the cell for the cooperative communication. The authentication key is used for the generation of an encryption key for data encryption associated with data transmission/reception between the base stations belonging to the cell and the subscriber station.

In operation 322, the serving base station 350 transmits a cell security context response, which is encrypted with the security key for the cooperative communication, to the subscriber station 300.

In operation 324, the subscriber station 300 generates a security link with the cooperative base station 360, and generates a security key for the security link to authenticate and encrypt, under participation of the authenticator/authentication server 370, the security link generated between the subscriber station 300 and the cooperative base station 360.

In operation 326, the subscriber station 300 generates a seed for the cooperative base station 360 in preparation for the case in which the cooperative base station 360 serves as a serving base station of the cell. The seed is a value that is arbitrarily generated in the subscriber station 300 such that the member base stations configuring the cell of the subscriber station 300 use different values, respectively. In operation 328, the subscriber station 300 transfers a cell security context including the seed for the cooperative base station 360 to the cooperative base station 360. The cell security context is transferred through the security link generated in operation 324. Then, in operations 330 and 332, the subscriber station 300 and the cooperative base station 360 configure a security key for sub-cooperative communication for the cooperative base station 360 by using the seed for the cooperative base station 360 and the Equation 1 or the Equation 2. The security key for the cooperative communication for the cooperative base station 360, generated in operations 330 and 332, is used to encrypt data in the cell when the cooperative base station 360 is changed to a serving base station in the cell of the subscriber station 300. In operation 334, the cooperative base station 360 transmits a cell security context response encrypted with the security key for the cooperative communication, configured in operation 332, to the subscriber station 300.

Thereafter, in operation 336, the subscriber station 300 performs data transmission/reception in the cell including the serving base station 350 and the cooperative base station 360 as a member base station. At this time, all transmitted/received data in the cell is encrypted with the security key for the cooperative communication, which has been generated by using the seed of the serving base station 350 in operations 318 and 320. The cooperative base station 360 performs data transmission/reception in the cell under control of the serving base station 350. Thus, the cooperative base station 360 can transmit/receive the data in the cell, without separately acquiring the security key of the serving base station 350.

Figure 4:
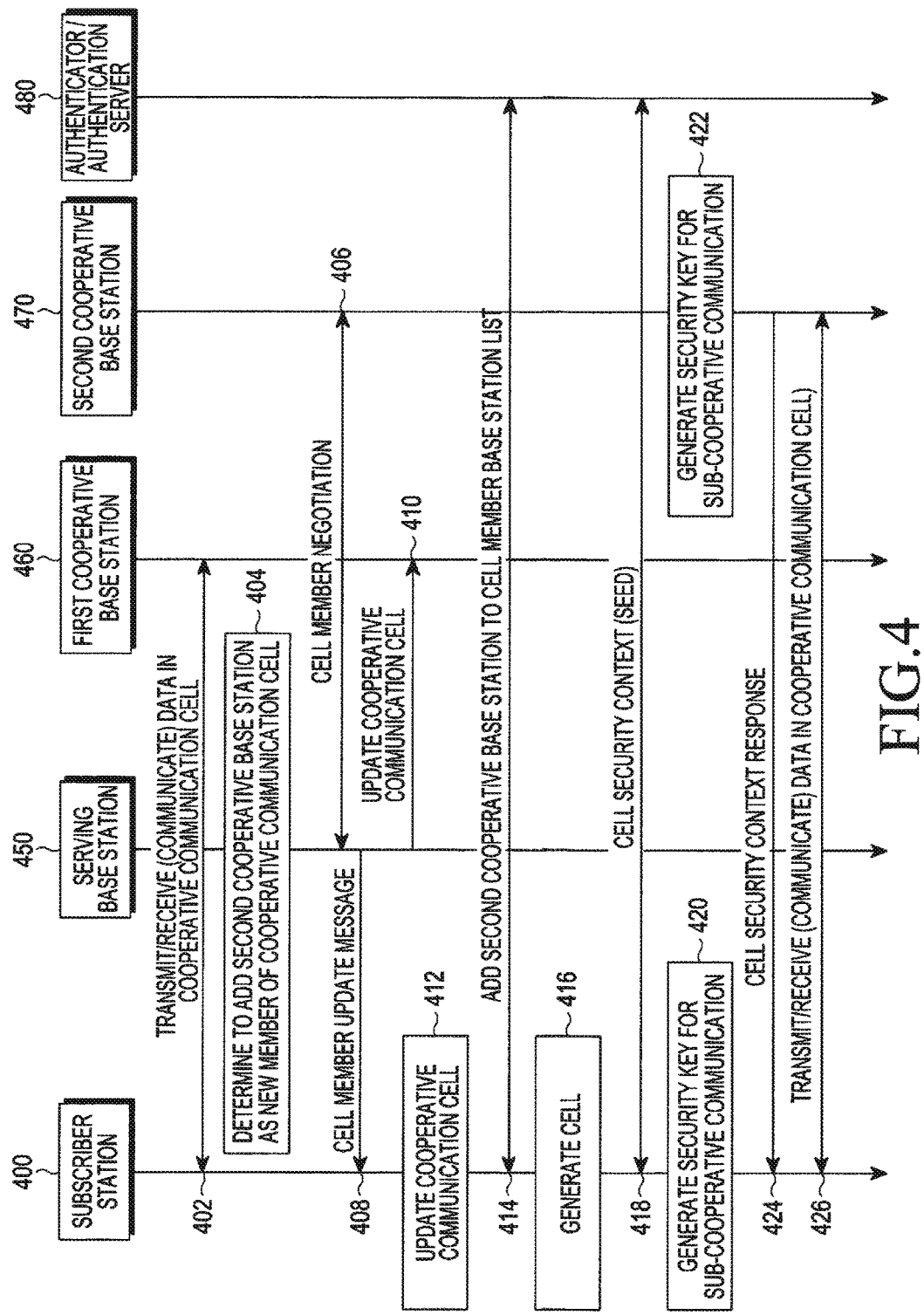
FIG. 4 is a signal flow diagram illustrating a procedure for managing a security key of a subscriber station in a process of re-configuring a cell that provides cooperative communication according to a first embodiment of the present disclosure.

FIG. 4 is a signal flow diagram illustrating an operation for managing a security key for cooperative communication of a subscriber station in a process of re-configuring a cell that provides the cooperative communication according to the first embodiment of the present disclosure. It is assumed that a subscriber station 400 and a serving base station 450 have generated a security key for the cooperative communication of a first cooperative base station 460 through the operation procedures of FIG. 3, and a second cooperative base station 470 is added as a new member base station for the cell of the subscriber station 400.

Referring to FIG. 4, in operation 402, the subscriber station 400 performs data transmission/reception through the cell configured with the serving base station 450 and the first cooperative base station 460. In operation 404, suppose it is determined that the serving base station 450 adds the second cooperative base station 470 as a new member configuring the cell. The serving base station 450 may acquire information on the second cooperative base station 470 from the subscriber station 400 through a channel measurement report. Then, in operation 406, the serving base station 450 performs a procedure for cell member negotiation with the second cooperative base station 470. In operation 408, the serving base station 450 transfers to the subscriber station 400 a message 'Cell update' informing that the second cooperative base station 470 has been added as a new member base station. In the same way, in operation 410, the serving base station 450 transfers to the first cooperative base station 460 a message 'Cell update' informing that the second cooperative base station 470 has been added as a new member base station.

In operation 412, the subscriber station 400 adds the second cooperative base station 470 in a cell member base station list stored in the subscriber station 400 to perform a cell member updating procedure. In operation 414, the subscriber station 400 generates a security link with the second cooperative base station 470, and generates, under participation of an authenticator/authentication server 480, a security key for the security link to authenticate and encrypt the security key generated between the subscriber station 400 and the second cooperative base station 470.

In operation 416, the subscriber station 400 generates a seed for the second cooperative base station 470. The seed is a value that is arbitrarily generated in the subscriber station 400 such that member base stations, configuring the cell which supports the cooperative communication for the subscriber station 400, use different values, respectively. In operation 418, the subscriber station 400 transfers a cell security context including the seed to the second cooperative base station 470. The seed is transferred through the security link generated in operation 414. In operations 420 and 422, the subscriber station 400 and the second cooperative base station 470 configure a security key for the cooperative communication for the second cooperative base station 470 by using the seed and Equation 1 or Equation 2. In operation 424, the second cooperative base station 470 transmits to the subscriber station 400 a cell security context response encrypted with the security key for the cooperative communication generated in operation 422.

In operation 426, the subscriber station 400 performs data transmission/reception in the cell configured with the serving base station 450, the first cooperative base station 460, and the second operative base station 470. At this time, all data is encrypted with the security key for the cooperative communication configured by using the seed of the serving base station 450 generated in operations 318 and 320 of FIG. 3. The first and second cooperative base stations 460 and 470 perform data transmission/reception in the cell under control of the serving base station 450. Thus, the first and second cooperative base stations 460 and 470 can perform the data transmission/reception in the cell, without separately acquiring the security key for the cooperative communication of the serving base station 450. Suppose the serving base station 450 is changed to a new serving base station in the cell of the subscriber station 400. When the new serving base station is changed to the first cooperative base station 460, the data transmitted/received in the cell is encrypted by using the security key for the sub-cooperative communication for the first cooperative base station 460, which has been configured through operations 326 to 334 of FIG. 3. In the same way, when the new serving base station is changed to the second cooperative base station 470, the data transmitted/received in the cell is encrypted by using the security key for the sub-cooperative communication for the second cooperative base station 470, which has been configured through operations 416 to 424 of FIG. 4.

Figure 5A:
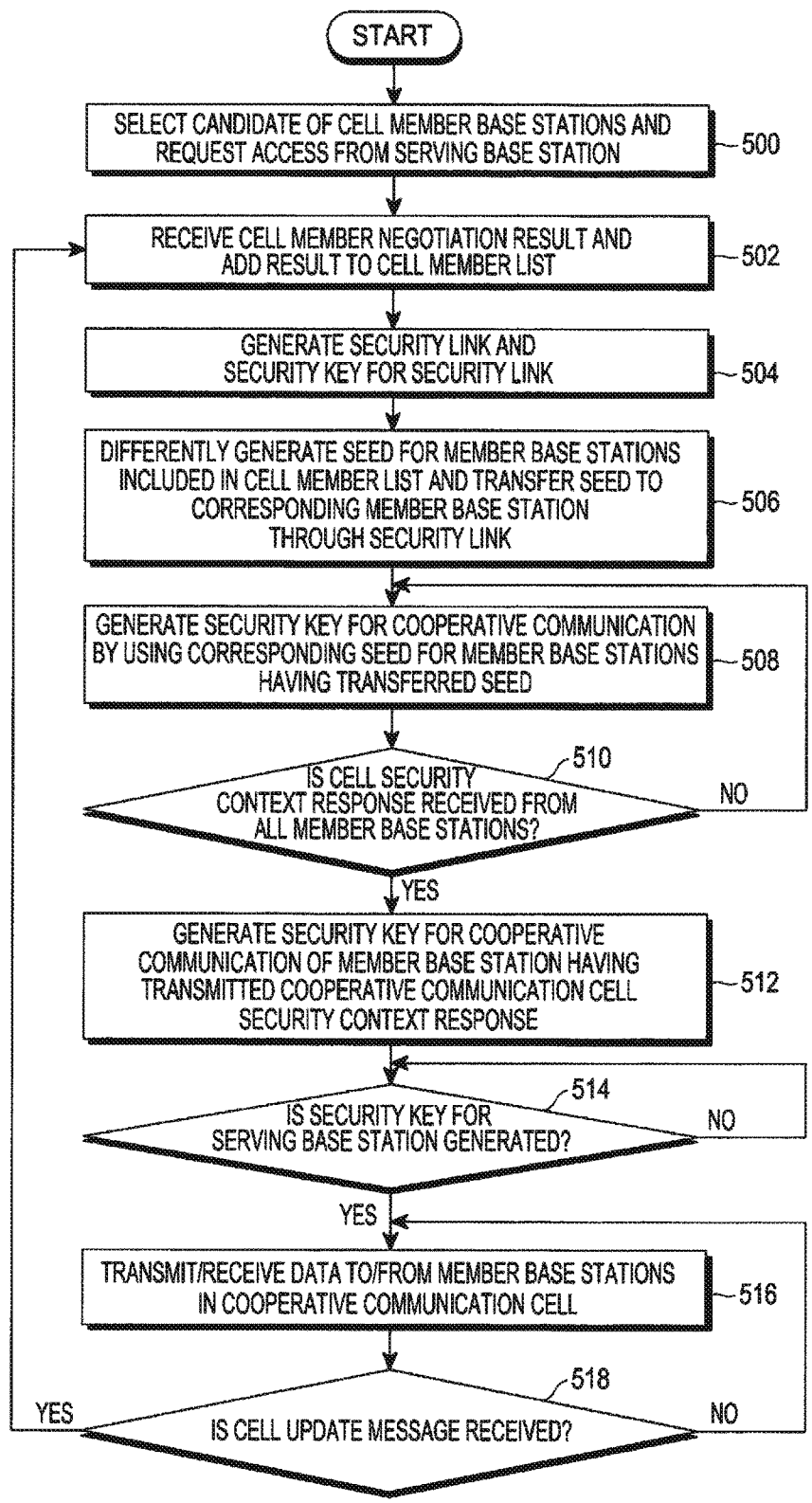
FIG. 5A is a flowchart illustrating an operation of a subscriber station according to a first embodiment of the present disclosure.

FIG. 5A is a flowchart illustrating an operation of a subscriber station according to a first embodiment of the present disclosure.

Referring to FIG. 5A, in operation 500, the subscriber station selects candidates of cell member base stations thereof, and transfers an access request to a base station, determined as a serving base station, among the candidates. At this time, the access request includes information on the base stations selected as the candidate. In operation 502, the subscriber station receives from the serving base station a result of member cell negotiation for the candidates. The subscriber station adds information on cooperative base stations, acquired through the result of the member cell negotiation, to a cell member list thereof. In operation 504, the subscriber station generates security links for the member base stations, and generates security keys for the security links for authenticating and encrypting the security links.

In operation 506, the subscriber station differently generates seeds for the member base stations included in the cell member list. The subscriber station transfers the seed corresponding to the member base station through the security link of the corresponding member base station. In operation 508, the subscriber station generates a security key of the corresponding member base station by using the corresponding seed and Equation 1 or Equation 2, for the member base stations to which the seed is transferred.

Thereafter, in operation 510, the subscriber station determines whether a cell security context response has been received, through monitoring the security links configured for the member base stations. When it is determined that the cell security context response has not been received from all the member base stations to which the seed is transferred, the subscriber station monitors the security links until the cell security context response for all the member base stations is received.

When it is determined that the cell security context response has been received from all the member base stations, the subscriber station proceeds to operation 512. In operation 512, the subscriber station generates a security key for the cooperative communication of the corresponding member base station by using the seed of the member base station and Equation 1 or Equation 2, for the member base station from which the cell security context response has been received. In operation 514, the subscriber station determines whether a security key for the cooperative communication for the serving base station has been generated. When it is determined that the security key for the cooperative communication for the serving base station has been generated, the subscriber station transmits/receives data encrypted with the security key for the cooperative communication for the serving base station to/from the member base stations, in operation 516. When it is determined in operation 514 that the security key for the cooperative communication for the serving base station has not been generated, the subscriber station continuously monitors the security link for the serving base station.

Thereafter, in operation 518, while transmitting/receiving data to/from the member base stations in the cell, the subscriber station determines whether a cell update message has been received from the serving base station. When it is determined that the cell update message has been received, suppose the cell update message instructs the addition of a new member base station. The subscriber station, in this case, returns to operation 502, and adds the new member base station to the cell member list. The subscriber station transfers a new seed to the new member base station through operations 504 and 506, and generates a security key for the cooperative communication for the new member base station by using the new seed. The subscriber station transmits/receives data encrypted with the security key for the cooperative communication for the serving base station in the cell including the new member base station. When it is determined that the cell update message has not been received, the subscriber station returns to operation 516.

Figure 5B:
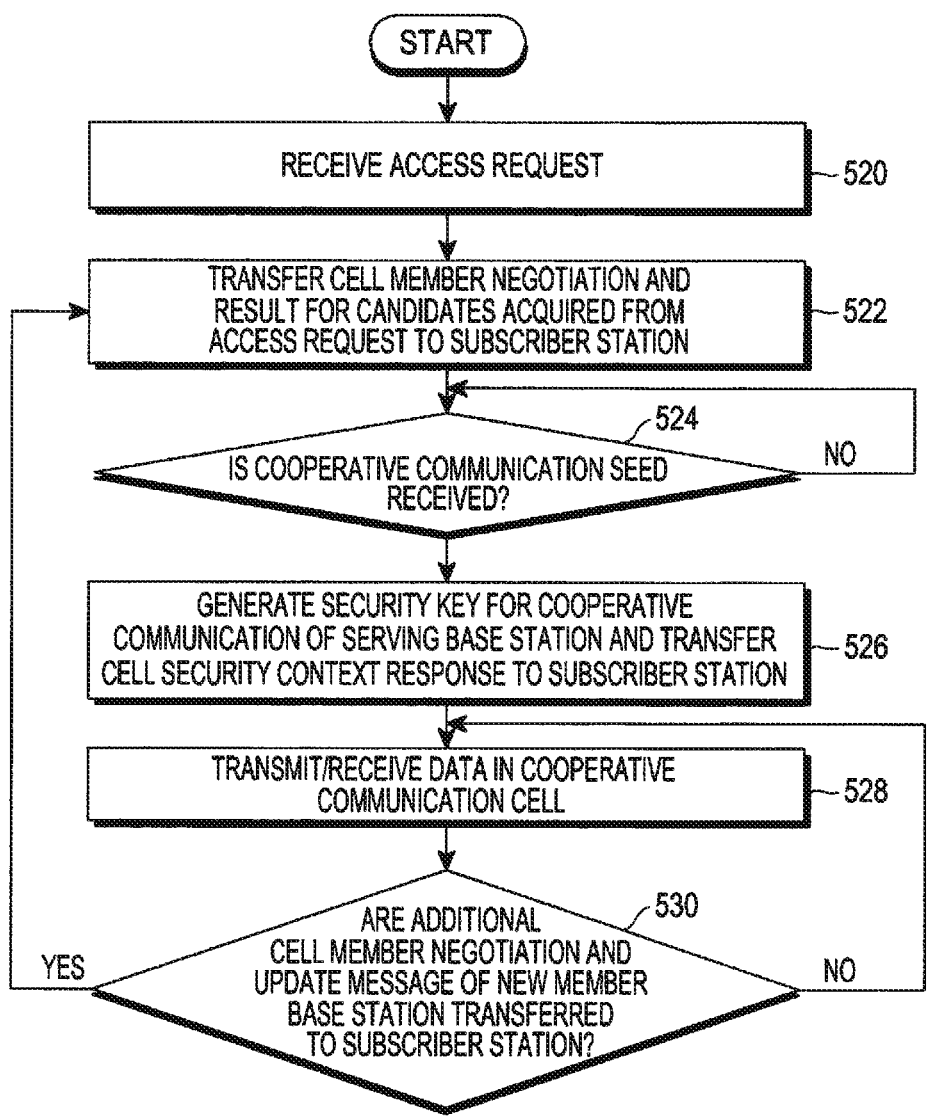
FIG. 5B is a flowchart illustrating an operation of a serving base station according to a first embodiment of the present disclosure.

FIG. 5B is a flowchart illustrating an operation of a serving base station according to a first embodiment of the present disclosure.

Referring to FIG. 5B, in operation 520, the serving base station receives an access request from a subscriber station. In operation 522, the serving base station performs a procedure for cell member negotiation, acquired from the access request, with base stations corresponding to candidates that are to configure a cell supporting cooperative communication for the subscriber station, and transfers a result of the negotiation to the subscriber station.

In operation 524, the serving base station determines whether a seed has been received from the subscriber station, through monitoring a security link configured between the serving base station and the subscriber station. When it is determined that the seed has not been received, the serving base station returns to operation 524, and waits for reception of the seed.

When it is determined that the seed has been received, the serving base station generates a security key for the cooperative communication of the serving base station by using the seed and Equation 1 or Equation 2, in operation 526. The serving base station transfers a cell security context response, informing that the security key for the cooperative communication of the serving base station is generated, to the subscriber station.

Thereafter, in operation 528, the serving base station transmits/receives data, encrypted by using the security key for the cooperative communication, in the cell. During data transmission/reception in the cell, it is identified in operation 530 whether the serving base station has determined to add a new member base station to the cell of the subscriber station. When it is identified that the addition of the new member base station has been determined, the serving base station returns to operation 522, and performs a procedure for cell member negotiation with the new member base station. The serving base station transfers the cell member update message, which is a result of the cell member negotiation with the new member base station, to the subscriber station. When it is identified that the addition of the new member base station has not been determined, the serving base station returns to operation 528.

Figure 5C:
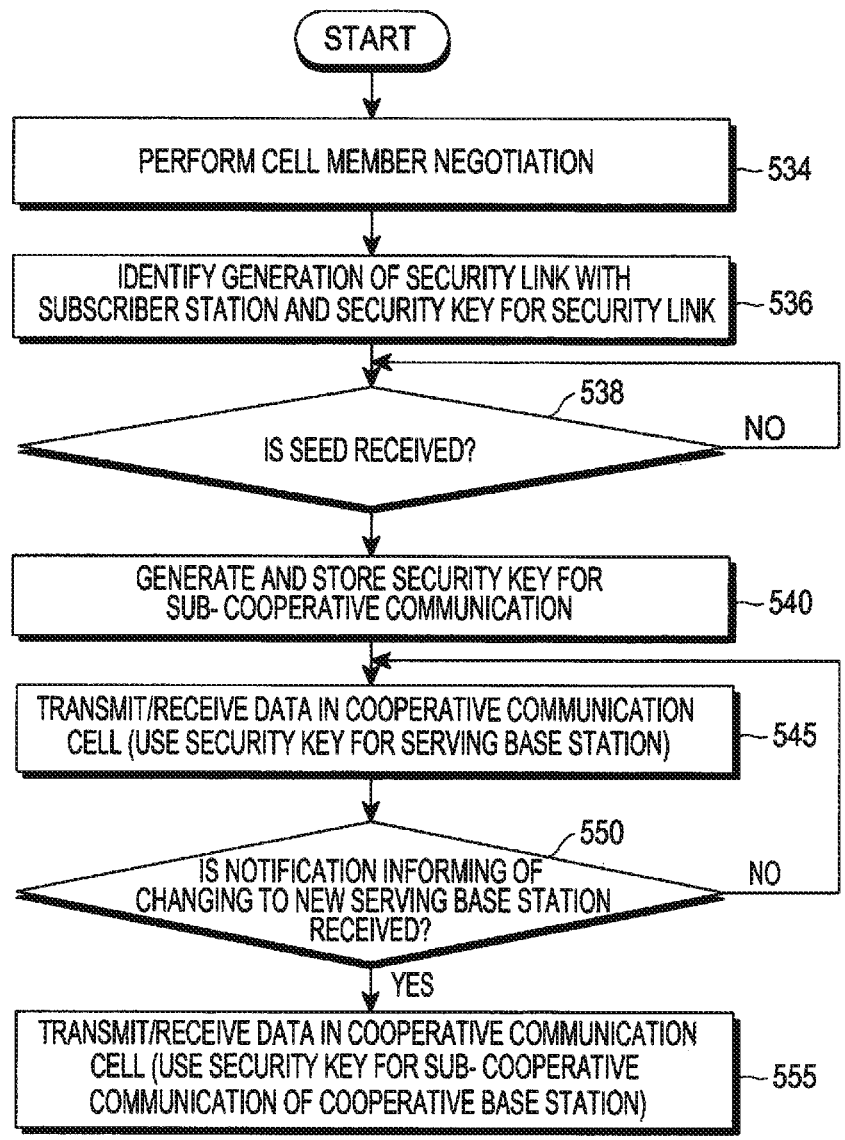
FIG. 5C is a flowchart illustrating an operation of a cooperative base station according to a first embodiment of the present disclosure.

FIG. 5C is a flowchart illustrating an operation of a cooperative base station according to a first embodiment of the present disclosure.

Referring to FIG. 5C, the cooperative base station performs cell member negotiation with a serving base station in operation 534, when an attempt for the cell member negotiation is received from the serving base station configuring a cell that provides cooperative communication for a specific subscriber station. Thereafter, in operation 536, the cooperative base station generates a security link with the subscriber station under control of an authenticator/authentication server, and determines that a security key for the security link for authenticating and encrypting the security link has been generated.

In operation 538, the cooperative base station determines whether a seed is received from the subscriber station, through monitoring the security link. When it is determined that the seed has not been received through the security link, the cooperative base station returns to operation 538, and waits for reception of the seed. At this time, the seed is set by the subscriber station to a value different from those of other member base stations. When the cooperative base station is changed to the serving base station in the cell, the seed is used for generating a security key for the cooperative communication that is to be used for data transmission/reception in the cell.

When it is determined that the seed has been received through the security link, the cooperative base station generates and stores a security key for sub-cooperative communication by using the seed and Equation 1 or Equation 2, in operation 540

Thereafter, in operation 545, the cooperative base station transmits/receives data, encrypted with the security key for the cooperative communication of the serving base station, under control of the serving base station in the cell. In operation 550, the cooperative base station determines whether a notification, informing that the cooperative base station has been changed to a new serving base station, is received from the serving base station. When it is determined that the notification has been received, in operation 555, the cooperative base station controls, as the new serving base station, communication of the member base stations in the cell, and transmits/receives, in the cell, data encrypted by using the security key for the sub-cooperative communication of the cooperative base station, which has been generated in operation 540.

—Second Embodiment—

Hereinafter, in the second embodiment of the present disclosure, a subscriber station sets a security key for a security link, generated for authenticating and encrypting a security link with a serving base station, as a security key for communication in a cell supporting cooperative communication for the subscriber station. At this time, the security key is generated based on a general authentication key. The subscriber station generates, with an arbitrary value, NONCE 1 for configuring a security key for sub-cooperative communication to be used when the corresponding cooperative base station is changed to a serving base station of the cell. NONCE 1 is a parameter used for preventing a session replay attack.

When receiving a request for generating the security key for the sub-cooperative communication through the serving base station, cooperative base stations transfer NONCE 1 to an authenticator/authentication server, and acquire additional information (e.g., a session key between the subscriber station and a corresponding base station or an authentication path of the subscriber station) to be used when the security key for the sub-cooperative communication is generated. The cooperative base stations generate the security key for the sub-cooperative communication by using NONCE 1 and the additional information, and generate Signature 1 that is a security signature and NONCE 2 that is set to an arbitrary value, based on the security key for sub-cooperative communication. The cooperative base stations transfer Signature 1, NONCE 2, and the authentication path of the subscriber station to the subscriber station through the serving base station. The subscriber station generates the security key for the sub-cooperative communication by using the authentication path of the subscriber station and NONCE 2, and generates Signature 2, which is a security signature, based on the security key for the sub-cooperative communication. The subscriber station transfers Signature 2 to the cooperative base stations.

Figure 6:
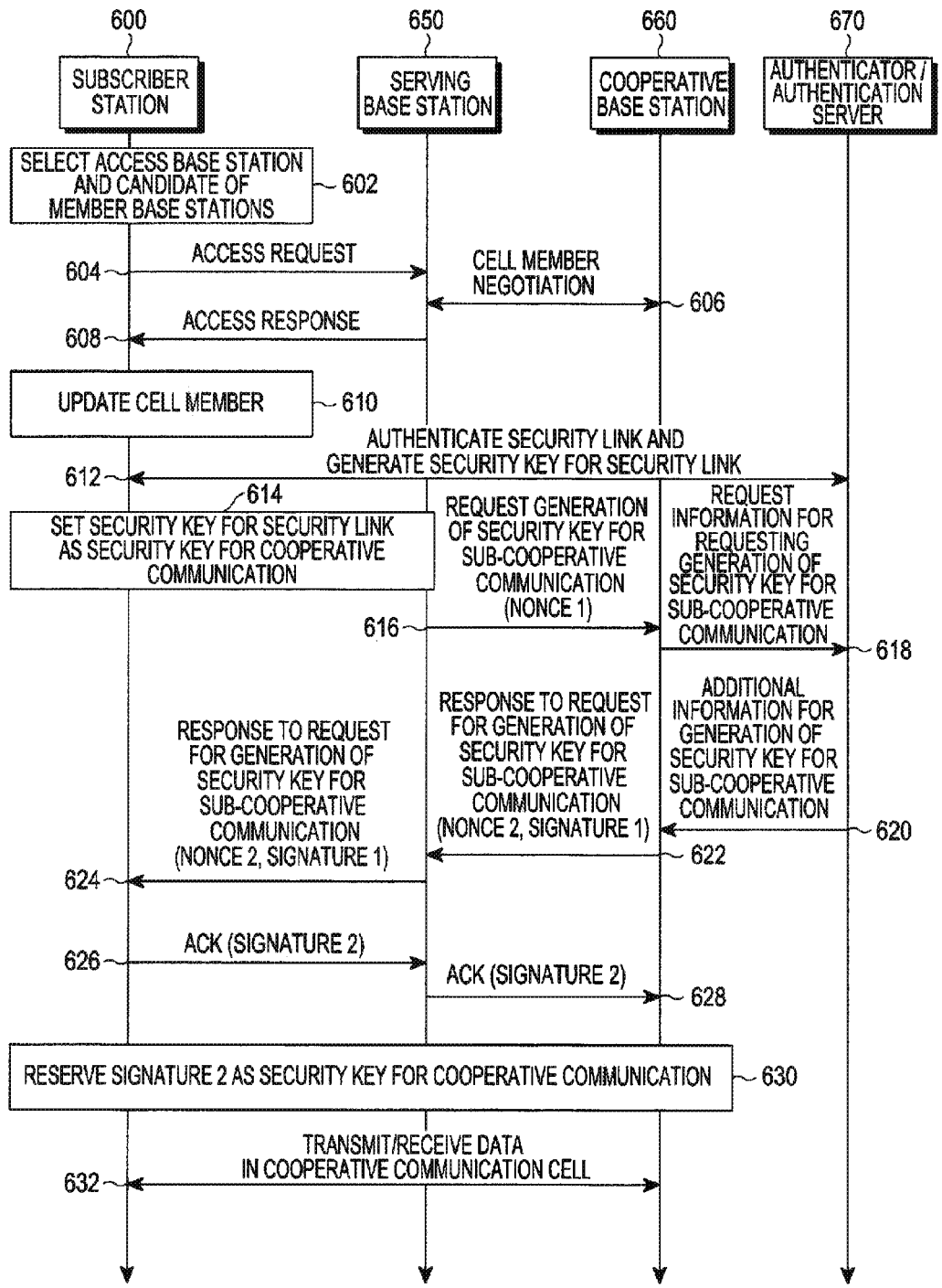
FIG. 6 is a signal flow diagram illustrating a procedure for managing a security key of a subscriber station in a process of configuring a cell that provides cooperative communication according to a second embodiment of the present disclosure.

FIG. 6 is a signal flow diagram illustrating a procedure for managing a security key of a subscriber station in a process of configuring a cell that provides cooperative communication according to a second embodiment of the present disclosure.

Referring to FIG. 6, in operation 602, a subscriber station 600 selects an access base station to access and a candidate of a member base station (referred to as 'a candidate base station') configuring a cell that provides cooperative communication. Suppose the subscriber station 600 selects a serving base station 650 as the access base station, and a cooperative base station 660 as the candidate base station. In operation 604, the subscriber station 600 transmits an access request signal to the serving base station 650. The access request signal may include information of the candidate base station which the subscriber station 600 has selected, and NONCE 1 which is one of the input values configuring a security key for the cooperative communication with the cooperative base station. NONCE 1 is a value that is arbitrarily generated by the subscriber station to be used for configuration of the security key for the cooperative communication with the cooperative base station 660, and is a parameter that is used for preventing a session replay attack. In operation 606, the serving base station 650 performs a procedure for cell member negotiation with the cooperative base station 660. In operation 608, the serving base station 650 transmits an access response signal for the access request signal to the subscriber station 660. At this time, the access response signal includes a result of the cell member negotiation result, i.e., information on the cooperative base station 660. In operation 610, the subscriber station 600 adds the cooperative base station 660 to a cell member base station list stored in the subscriber station 600, and performs a cell member updating procedure.

Thereafter, in operation 612, the subscriber station 600 generates a security link with the serving base station 660, and generates a security key for the security link for authenticating and encrypting the security link generated between the subscriber station 600 and the serving base station 650, under participation of an authenticator/authentication server 670. In operation 614, the subscriber station 600 and the serving base station 650 set the security key for the security link as a security key for encrypting data transmitted/received between the member base stations and the subscriber station 600 in the cell, i.e., a security key for the cooperative communication. In operation 616, the serving base station 650 transfers, to the cooperative base station 660, a request for generating a security key for a sub-cooperative communication between the subscriber station 600 and the cooperative base station 660. The request for generating the security key for the sub-cooperative communication includes information (referred to as 'shared information'), which may be shared with the cooperative base station 660, among the information on the security key for the cooperative communication of the subscriber station 600 and the serving base station 60, i.e., NONCE 1, which has received from the subscriber station 600 in operation 606, and the information used when the security key for the security link between the subscriber station 600 and the serving base station 650 is generated in operation 612. For example, the shared information includes a subscriber station authentication path for the subscriber station and the serving base station 650.

In operation 618, the cooperative base station 660 requests information for generating the security key for the sub-cooperative communication with the subscriber station 600 from the authenticator/authentication server 670. The request of the information for generating the security key for the sub-cooperative communication includes NONCE 1 and the shared information. In operation 620, the cooperative base station 660 receives, from the authenticator/authentication server 670, additional information necessary for generating the security key for the sub-cooperative communication with the subscriber station 600. For example, the additional information corresponds to a session key between the subscriber station 600 and the corresponding cooperative base station 660, and the subscriber station authentication path for the subscriber station 600 and the corresponding cooperative base station 660.

In operation 622, the cooperative base station 660 configures the security key for the sub-cooperative communication with the subscriber station 600, by using NONCE 1 and the additional information received from the authenticator/authentication server 670 in operation 620. Further, the cooperative base station 660 generates Signature 1, which is a security signature based on the security key for sub-cooperative communication with the subscriber station 600, and NONCE 2 that is set to an arbitrary value. NONCE 2 is a parameter that is arbitrarily generated to be used for preventing the session replay attack for the subscriber station 600 in the cooperative base station 660. The cooperative base station 660 transfers to the serving base station 650 a response to the request for generating the security key for the sub-cooperative communication, including Signature 1, NONCE 2, and the subscriber station authentication path for the cooperative base station 660.

In operation 624, the serving base station 650 transfers, to the subscriber station 600, the response of the cooperative base station 660 to the request for generating the security key for the sub-cooperative communication. Likewise, the response to the request for generating the security key for the sub-cooperative communication includes Signature 1 and NONCE 2, which have been received in operation 622.

Thereafter, in operation 626, the subscriber station 600 configures a security key for the sub-cooperative communication that will be used for communication with the cooperative base station 660, by using Signature 1 and NONCE 2 which have been received in operation 624 and the subscriber station authentication path for the cooperative base station 660, and generates Signature 2 that is a security signature, by using the security key for the sub-cooperative communication. The subscriber station 600 transfers, to the serving base station 650, an acknowledgment (ACK), including Signature 2, for the response to the request for generating the security key for the sub-cooperative communication. Then, in operation 628, the serving base station 650 transfers, to the cooperative base station 660, an acknowledgment (ACK), including Signature 2, for the response to the request for generating the security key for the sub-cooperative communication.

In operation 630, when the cooperative base station 660 serves as a serving base station in the cell of the subscriber station 600, the subscriber station and the cooperative base station 660 set in advance the security key for the sub-cooperative communication, generated through operations 616 to 628, as a security key for cooperative communication for encrypting data that will be transmitted/received in the cell that provides the cooperative communication.

In operation 632, the subscriber station 600 performs data transmission/reception in the cell including the serving base station 650 and the cooperative base station 660 as a member base station. At this time, all the data transmitted/received in the cell is encrypted with the security key for the cooperative communication, which has been set as the security key for the security link of the serving base station 650 in operation 614. The cooperative base station 660 performs data transmission/reception in the cell under control of the serving base station 650. Thus, the cooperative base station 660 can transmit/receive data in the cell, without separately acquiring the security key for the cooperative communication of the serving base station 650.

Figure 7A:
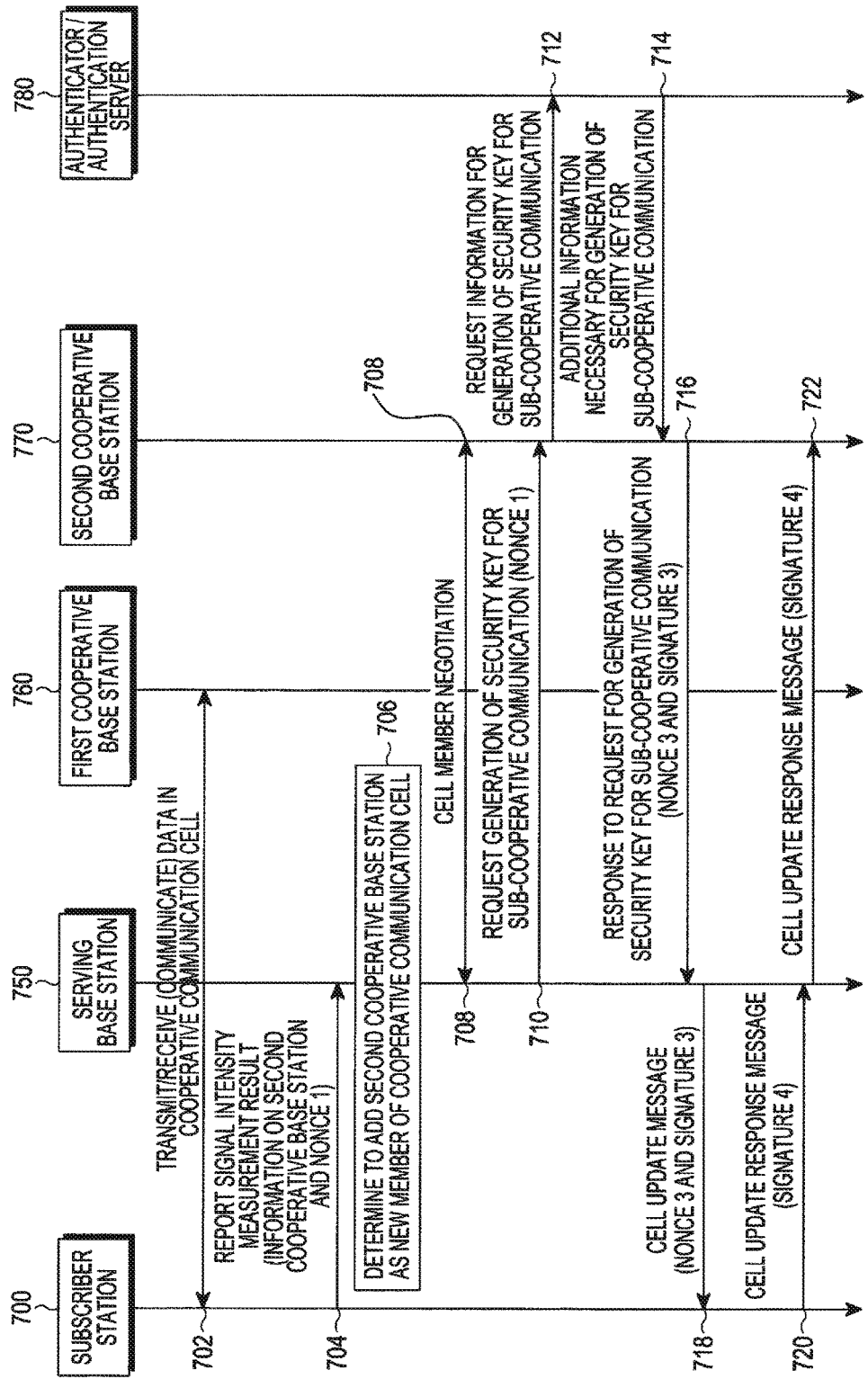
FIGS. 7A and 7B are signal flow diagrams illustrating a procedure for managing a security key of a subscriber station in a process of re-configuring a cell that provides cooperative communication according to a second embodiment of the present disclosure.
Figure 7B:
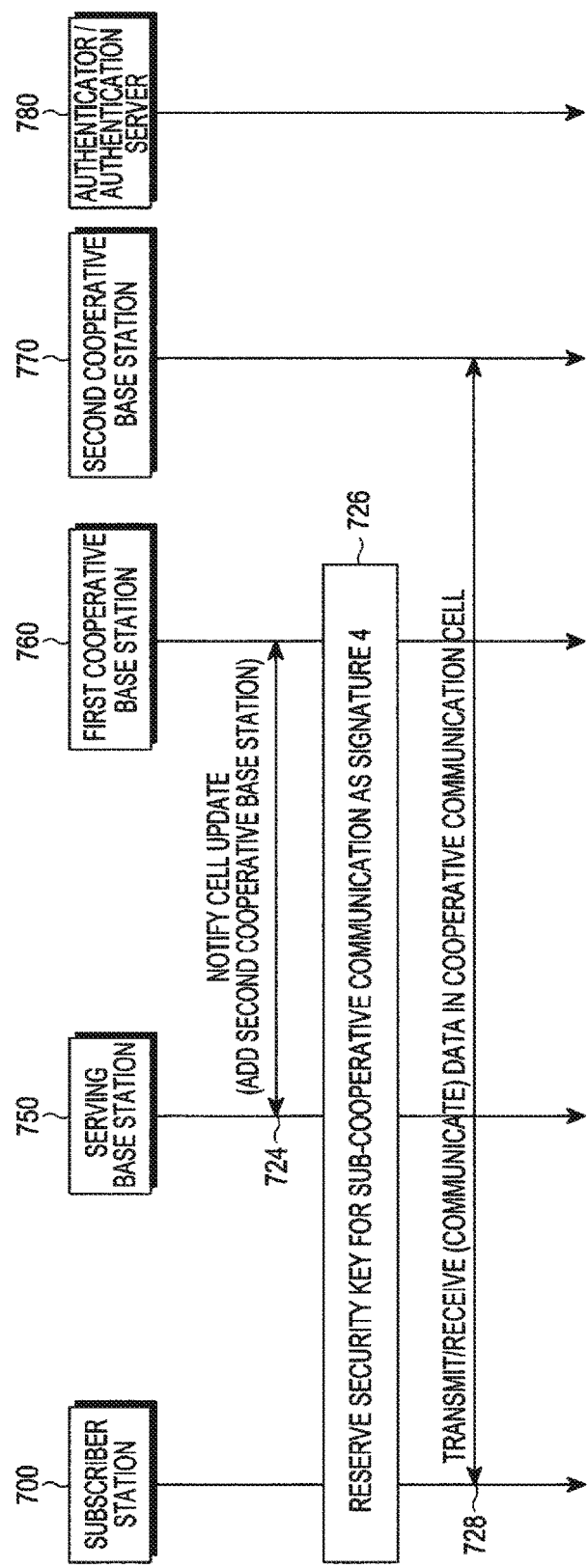

FIGS. 7A and 7B are signal flow diagrams illustrating a procedure for managing a security key of a subscriber station in a process of re-configuring a cell that provides cooperative communication according to a second embodiment of the present disclosure. It is assumed that a subscriber station 700 and a serving base station 750 have generated a security key of a first cooperative base station 760 through the operation procedures of FIG. 6, and a second cooperative base station 770 is added as a new member base station for the cell that provides cooperative communication for the subscriber station 700.

Referring to FIGS. 7A and 7B, in operation 702, the subscriber station 700 performs data transmission/reception through the cell configured with the serving base station 750 and the first cooperative base station 760. In operation 704, the subscriber station 700 performs a procedure for measuring a signal intensity for adjacent base stations, and transfers, to the serving base station 750, a result report on the procedure for measuring the signal intensity for the adjacent base stations.

Suppose it is determined in operation 706 that the serving base station 750 will add the second cooperative base station 770 as a new member base station, which configures the cell that provides the cooperative communication for the subscriber station 700, through the procedure for measuring the signal intensity for the adjacent base stations. The result report includes information on the second cooperative base station 770, and NONCE 1 necessary for setting a security key for cooperative communication of the first cooperative base station.

The serving base station 750 determines through the result report to add the second cooperative base station 770 as the new member base station, in operation 706, and performs a procedure for cell member negotiation with the second cooperative base station 770, in operation 708. When the procedure for the cell member negotiation is completed, the serving base station 770 transfers, to the second cooperative base station 770, a request for generating a security key for sub-cooperative communication between the second cooperative base station 770 and the subscriber station 700, in operation 710. The request for generating the security key for the sub-cooperative communication includes NONCE 1 received from the subscriber station 700 in operation 704, and the shared information used when the security key for the security link between the subscriber station 700 and the serving base station 750 is generated. For example, the shared information includes the subscriber station authentication path for the subscriber station and the serving base station 650.

In operation 712, the second cooperative base station 770 requests, from an authenticator/authentication server 770, information for generating the security key for the sub-cooperative communication with the subscriber station.

The request of information for generating the security key for the sub-cooperative communication includes NONCE 1 and the shared information. In operation 714, the cooperative base station 760 receives, from the authenticator/authentication server 770, additional information necessary for generating the security key for the sub-cooperative communication with the subscriber station 600. For example, the additional information corresponds to a session key between the subscriber station 700 and the corresponding cooperative base station (e.g., the first cooperative base station 760), and the subscriber station authentication path for the subscriber station 700 and the first cooperative base station 760.

In operation 716, the second cooperative base station 770 configures the security key for the sub-cooperative communication with the subscriber station 700, by using the additional information received from the authenticator/authentication server 780 and NONCE 1. Further, the second cooperative base station 770 generates Signature 3, which is a security signature based on the security key for the sub-cooperative communication with the subscriber station 700, and NONCE 3 that is set to an arbitrary value. NONCE 3 is a parameter that is arbitrarily generated to be used for preventing a session replay attack for the subscriber station 700 in the second cooperative base station 770. The second cooperative base station 770 transfers, to the serving base station 750, a response to the request for generating the security key for the sub-cooperative communication, including Signature 3, NONCE 3, and the subscriber station authentication path for the second cooperative base station 770.

In operation 718, the serving base station 750 transfers, to the subscriber station 700, a cell update message informing that the second cooperative base station 770 has been added as a new member base station. The cell update message includes Signature 3 and NONCE 3.

In operation 720, the subscriber station 700 performs a cell member update procedure of adding the second cooperative base station 770 to a cell member list thereof, and transfers, to the serving base station 750, a cell member update response message informing of this. At this time, the subscriber station 700 configures the security key for the sub-cooperative communication with the second cooperative base station 770 by using Signature 3 and NONCE 3, and generates Signature 4, which is a security signature, based on the security key for the sub-cooperative communication. Thus, the cell member update response message includes Signature 4.

In operation 722, the serving base station 750 transfers the cell member update response message including Signature 4 to the second cooperative base station 770. In operation 724, the serving base station 750 transfers, to the first cooperative base station 760, a cell update notification informing that the second cooperative base station 770 has been added as a new member base station.

In operation 726, when the second cooperative base station 770 serves as the serving base station in the cell that provides the cooperative communication for the subscriber station 700, the subscriber station 700 and the second cooperative base station 770 set in advance the security key for the sub-cooperative communication, generated through operations 710 to 722, as a security key for the cooperative communication for encrypting data that will be transmitted/received in the cell. Thereafter, in operation 728, the subscriber station 700 performs data transmission/reception in the cell configured with the serving base station 750, the first cooperative base station 760, and the second cooperative base station 770. At this time, all data transmitted/received in the cell that provides the cooperative communication is encrypted with the security key for the cooperative communication which has been set as the security key for the security link of the serving base station 650 in operation 614. The first and second cooperative base stations 760 and 770 perform data transmission/reception in the cell under control of the serving base station 750. Thus, first and second cooperative base stations 760 and 770 can transmit/receive the data in the cell, without separately acquiring the security key for the cooperative communication of the serving base station 750.

Suppose the serving base station 750 is changed to a new serving base station in the cell that provides the cooperative communication for the subscriber station 700. When the new serving base station is changed to the first cooperative base station 760, the data transmitted/received in the cell is encrypted through the security key for the sub-cooperative communication set through operations 616 to 630 of FIG. 6. In the same way, when the new serving base station is changed to the second cooperative base station 770, the data transmitted/received in the cell is encrypted through the security key for the sub-cooperative communication set through operations 710 to 726 of FIGS. 7A and 7B.

Figure 8A:
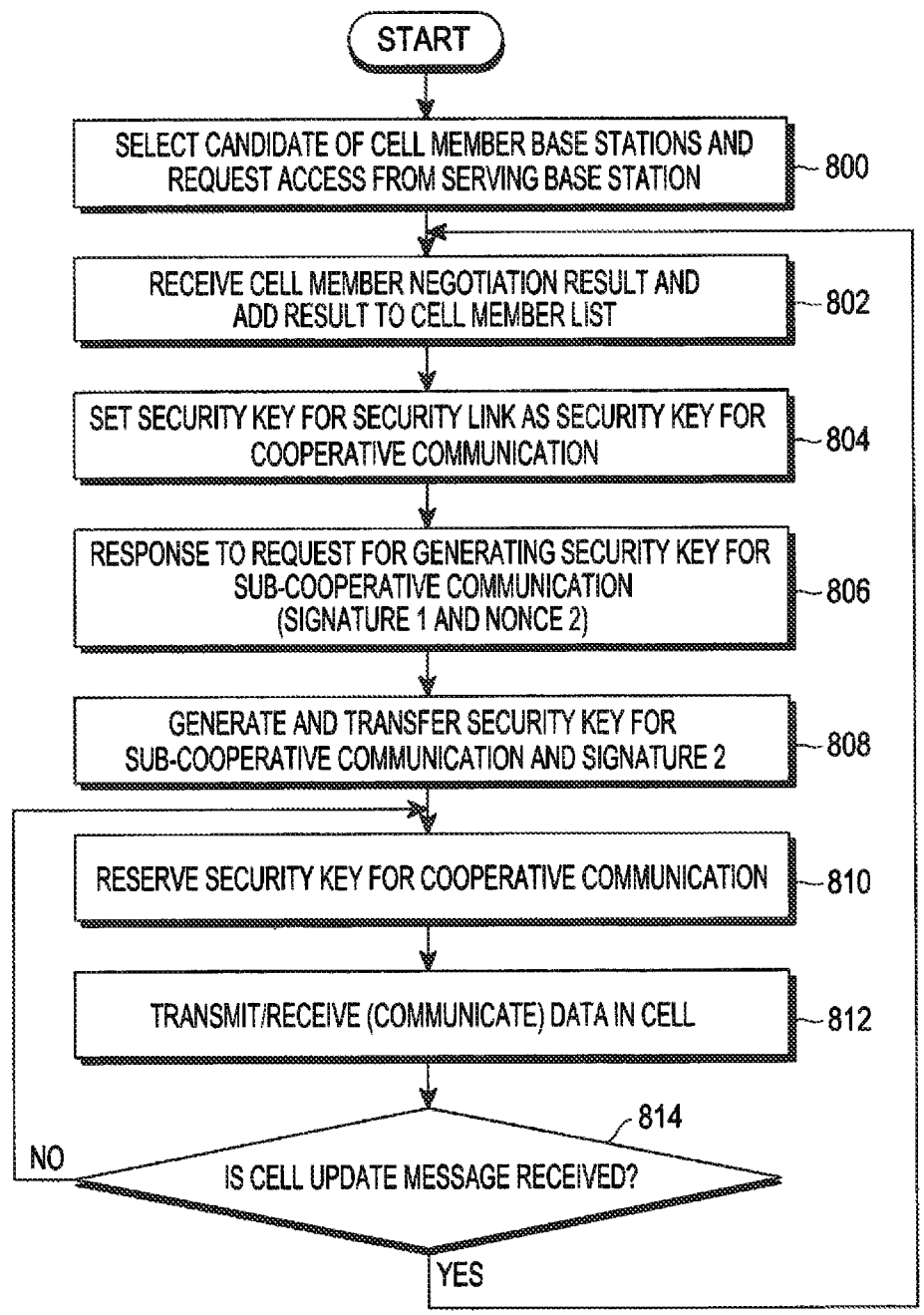
FIG. 8A is a flowchart illustrating an operation of a subscriber station according to a second embodiment of the present disclosure.

FIG. 8A is a flowchart illustrating an operation of a subscriber station according to a second embodiment of the present disclosure.

Referring to FIG. 8A, in operation 800, the subscriber station selects candidates of cell member base stations thereof, and transfers an access request to a base station, determined as a serving base station, among the candidates. At this time, the access request includes information on the base stations selected as the candidate and NONCE 1 which is one of the input values configuring a security key for cooperative communication with a cooperative base station. NONCE 1 is a value that is arbitrarily generated by the subscriber station to be used for configuration of the security key for the cooperative communication with the cooperative base station, and is a parameter that is used for preventing a session replay attack.

In operation 802, the subscriber station receives a member cell negotiation result for the candidates from the serving base station. The subscriber station adds information on the cooperative base stations, which is acquired through the cell member negotiation result, to a cell member list thereof. In operation 804, the subscriber station generates a security link for the member stations, and generates a security key for the security link for authenticating and encrypting the security link. The subscriber station sets the encryption key for the security link as a security key for cooperative communication for communication in the cell. Thereafter, in operation 806, the subscriber stations receive a response to a request for generation of the security key for the sub-cooperative communication of the cooperative base station, through the serving base station. The response to the request for the generation of the security key for the sub-cooperative communication includes Signature 1, which is a security signature generated based on the security key for the sub-cooperative communication which is generated in the cooperative base station by using additional information and NONCE 1 received from an authenticator/authentication server, NONCE 2 that is set to an arbitrary value, and a subscriber station authentication path for the cooperative base station. NONCE 2 is a parameter that is arbitrarily generated to prevent the session replay attack for the subscriber station in the cooperative base station.

In operation 808, the subscriber station configures a security key for sub-cooperative communication, which will be used for communication with the cooperative base station, by using NONCE 2 and information on the subscriber station authentication path for the cooperative base station, and generates Signature 2, which is a security signature, by using the security key for the sub-cooperative communication. The subscriber station transfers the response, including Signature 2, to the request for the generation of the security key for the sub-cooperative communication to the cooperative base station through the serving base station.

In operation 810, the subscriber station sets in advance the security key for the sub-cooperative communication as a security key for the cooperative communication that will be used when the cooperative base station serves as a serving base station in the cell.

In operation 812, the subscriber station transmits/receives, in the cell, data encrypted with the security key for the cooperative communication, which has been set as the security key for the security link of the serving base station. In operation 814, while transmitting/receiving data in the cell, the subscriber station determines whether a cell update message has been received. When it is determined that the cell update message has not been received, the subscriber station continuously performs the data transmission/reception in the cell.

When it is determined that the cell update message has been received, suppose the cell update message instructs the addition of a new member base station. The subscriber station, in this case, returns to operation 802, and adds the new member base station to the cell member list. The subscriber station performs a procedure of transferring, to the cooperative base station, NONCE 3 for generating a security key for sub-cooperative communication for the new member base station through operations 804 to 812, receiving NONCE 3 and Signature 3 that is a security signature based on the security key, received through the serving base station, for the sub-cooperative communication of the new member base station, generating the security key for the sub-cooperative communication by using the subscriber authentication path for the cooperative base station and NONCE 3, generating Signature 4, which is a security signature, based on the generated security key for the sub-cooperative communication, and reserving the security key for the sub-cooperative communication as a security key for cooperative communication that will be used when the new member base station is changed to the serving base station.

Figure 8B:
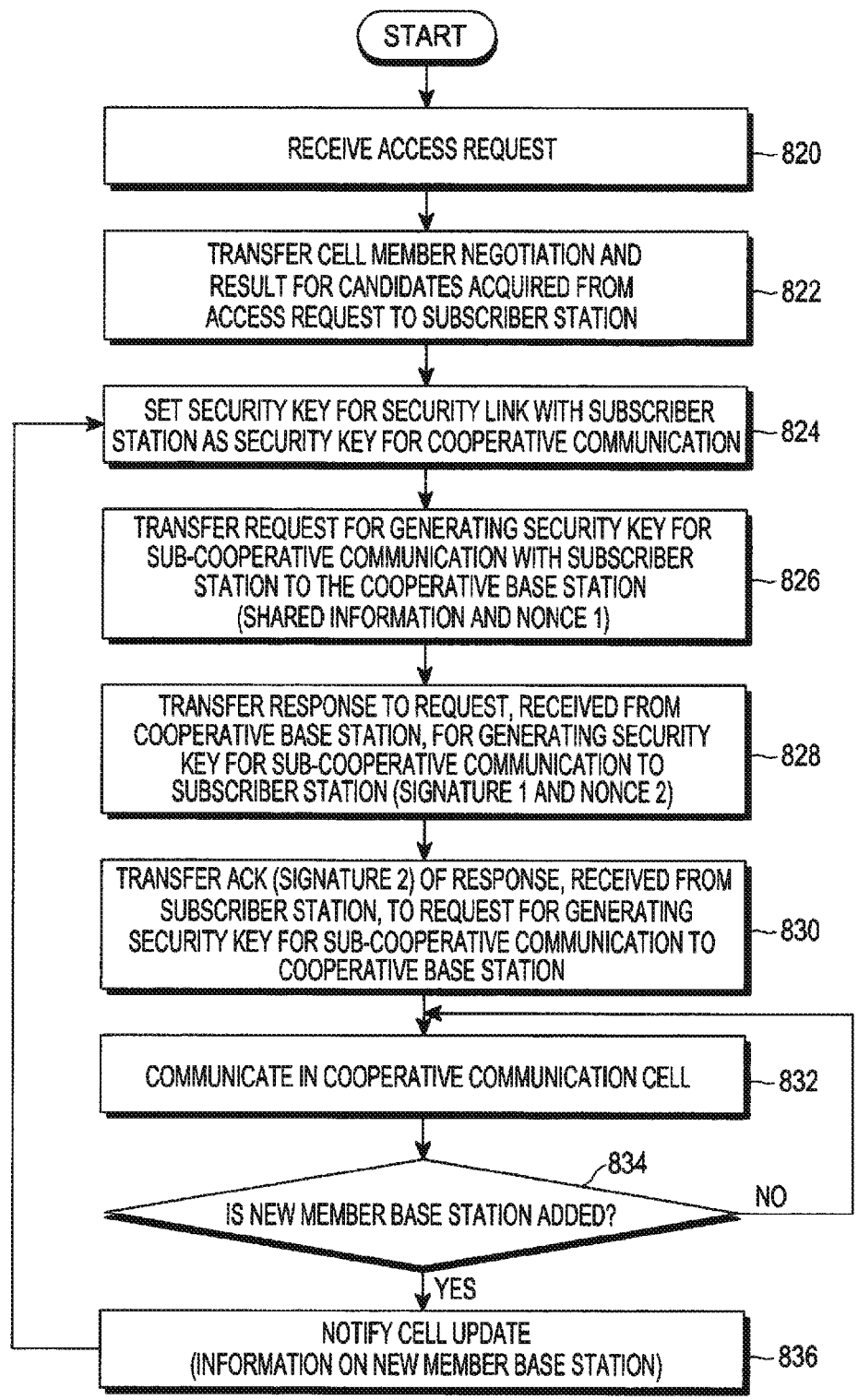
FIG. 8B is a flowchart illustrating an operation of a serving base station according to a second embodiment of the present disclosure.

FIG. 8B is a flowchart illustrating an operation of a serving base station according to a second embodiment of the present disclosure.

Referring to FIG. 8B, in operation 820, the serving base station receives an access request from a subscriber station. In operation 822, the serving base station performs a procedure for cell member negotiation, acquired from the access request, with base stations corresponding to candidates that are to configure a cell supporting cooperative communication for the subscriber station, and transfers a result of the negotiation to the subscriber station.

In operation 824, the serving base station generates a security link with the subscriber station, and generates a security key for the security link for authenticating and encrypting the security link. The serving base station sets the encryption key for the security link as a security key for cooperative communication in the cell.

In operation 826, the serving base station requests a security key for sub-cooperative communication with the subscriber station from the cooperative base stations. The security key for the sub-cooperative communication includes NONCE 1 acquired from the access request, and the shared information in operation 606. NONCE 1 is a value that is arbitrarily generated by the subscriber station to be used for configuration of the security key for the cooperative communication with the cooperative base station, and is a parameter that is used for preventing a session replay attack.

In operation 828, the serving base station transfers, to the subscriber station, the response to the request for generating the security key for the sub-cooperative communication, which has been received from the cooperative base station. The response to the setting of the security key for the sub-cooperative communication includes Signature 1 that is a security signature generated based on the security key for the sub-cooperative communication which is generated in the cooperative base station by using additional information and NONCE 1 received from an authenticator/authentication server, NONCE 2 that is set to an arbitrary value, and information on a subscriber station authentication path for the cooperative base station. NONCE 2 is a parameter that is arbitrarily generated to prevent the session replay attack for the subscriber station in the cooperative base station.

In operation 830, the serving base station receives, from the subscriber station, an acknowledgement (ACK) of the response to the request for generating the security key for the sub-cooperative communication, and transfers the ACK to the cooperative base station. The ACK of the response to the request for generating the security key for the sub-cooperative communication includes Signature 2 that is a security signature based on the security key for the sub-cooperative communication generated by the subscriber station, by using the subscriber station authentication path for the cooperative base station and NONCE 2.

In operation 832, the serving base station performs communication in the cell, by using the security key for the cooperative communication which has been set in operation 824. The serving base station proceeds to operation 834 to perform a procedure for measuring a signal intensity for an adjacent cell of the serving base station being in the communication, and determines the addition of a new member base station based on the measured signal intensity. When the addition of the new member base station is not determined, the subscriber station returns to operation 832, and performs the communication in the cell by using the existing security key.

When it is determined that the new member base station is to be added, the serving base station transfers, to the subscriber station, a cell update notification informing of the addition of the new member base station, in operation 836. The serving base station helps the security key for the sub-cooperative communication for the new member base station be generated through operations 824 to 828.

Figure 8C:
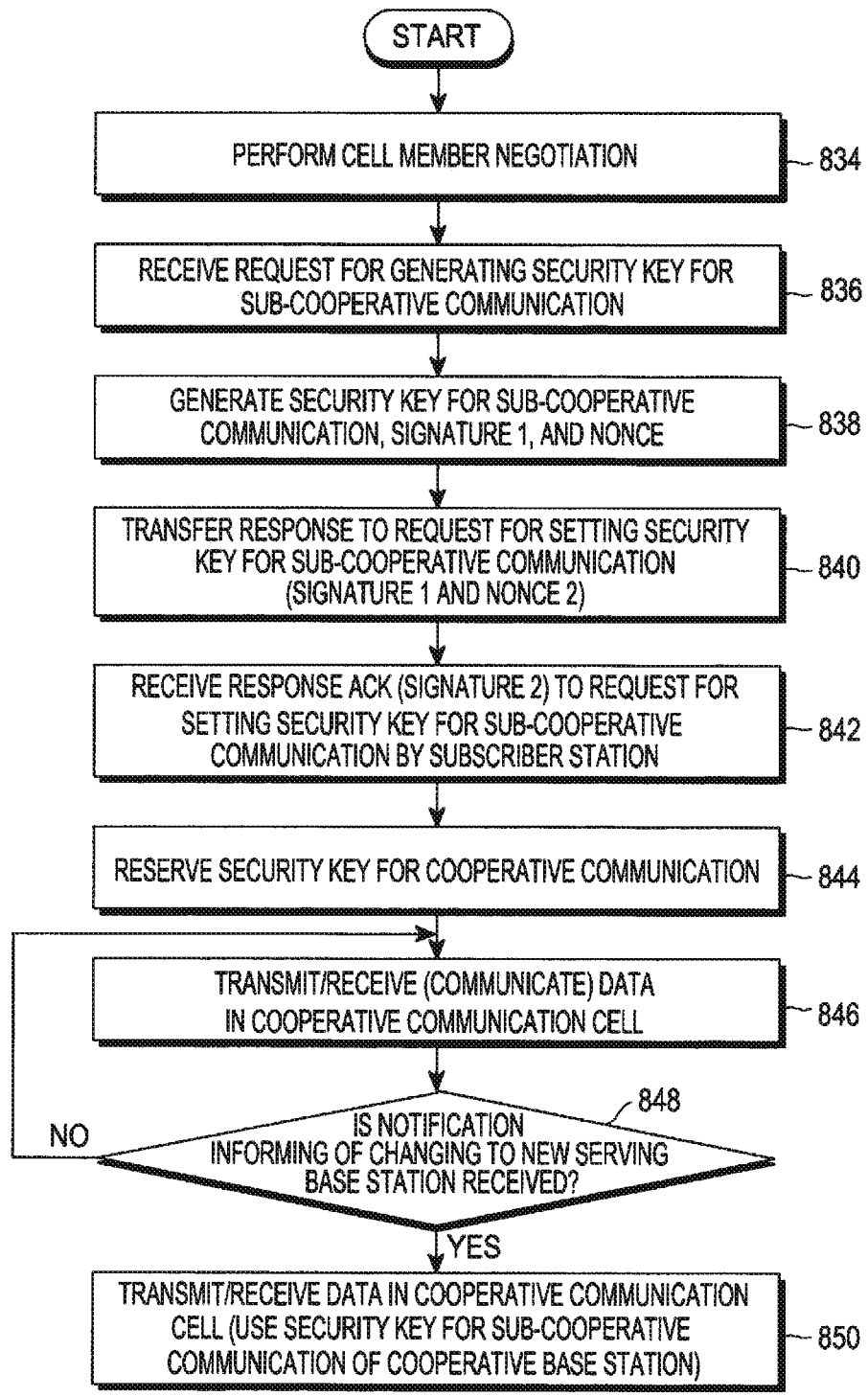
FIG. 8C is a flowchart illustrating an operation of a cooperative base station according to a second embodiment of the present disclosure.

FIG. 8C is a flowchart illustrating an operation of a cooperative base station according to a second embodiment of the present disclosure.

Referring to FIG. 8C, the cooperative base station performs cell member negotiation with a serving base station in operation 834, when an attempt for the cell member negotiation is received from the serving base station configuring a cell that provides cooperative communication for a specific subscriber station.

In operation 836, the cooperative base station receives, from the serving base station, a request for generating a security key for sub-cooperative communication with the subscriber station. The security key for the sub-cooperative communication includes NONCE 1 acquired from the access request, and the shared information in operation 606. NONCE 1 is a value that is arbitrarily generated by the subscriber station to be used for the configuration of the security key for the cooperative communication with the cooperative base station, and is a parameter that is used for preventing a session replay attack.

In operation 838, the cooperative base station requests and acquires additional information for the security key for the sub-cooperative communication from an authenticator/authentication server. The cooperative base station generates the security key for the sub-cooperative communication by using the additional information and NONCE 1, and generates Signature 1 that is a security signature based on the security key for sub-cooperative communication, and NONCE 2 that is set to an arbitrary value. NONCE 2 is a parameter that is arbitrarily generated for prevention of the session replay attack for the subscriber station in the cooperative base station.

In operation 840, the cooperative base station transfers, to the subscriber station, a response to the request for setting the security key for the sub-cooperative communication, including Signature 1, NONCE 2, and a subscriber station authentication path for the cooperative base station.

In operation 842, the cooperative base station receives the response, which is transmitted from the subscriber station and includes Signature 2, to the request for setting the security key for the sub-cooperative communication, through the serving base station. Signature 2 is a security signature based on the security key for the sub-cooperative communication generated by the subscriber station through the subscriber station authentication path for the cooperative base station and NONCE 2.

In operation 844, the cooperative base station sets in advance the security key for the sub-cooperative communication as a security key for the cooperative communication that will be used when the cooperative base station serves as the serving base station in the cell for the cooperative communication of the subscriber station. In operation 846, the cooperative base station transmits/receives, in the cell, data encrypted with the security key for the cooperative communication which has been set as the security key for the security link of the serving base station.

In operation 848, the cooperative base station determines whether a notification, representing that the cooperative base station was changed to a new serving base station, has been received from the serving base station.

When it is determined that the notification has been received, the cooperative base station controls communication of the member base stations in the cell as a new serving base station, in operation 850, and transmits/receives, in the cell, data encrypted by using the security key for the sub-cooperative communication of the cooperative base station which has been reserved in operation 844. When it is determined that the notification has not been received, the cooperative base station returns to operation 846.

Figure 9:
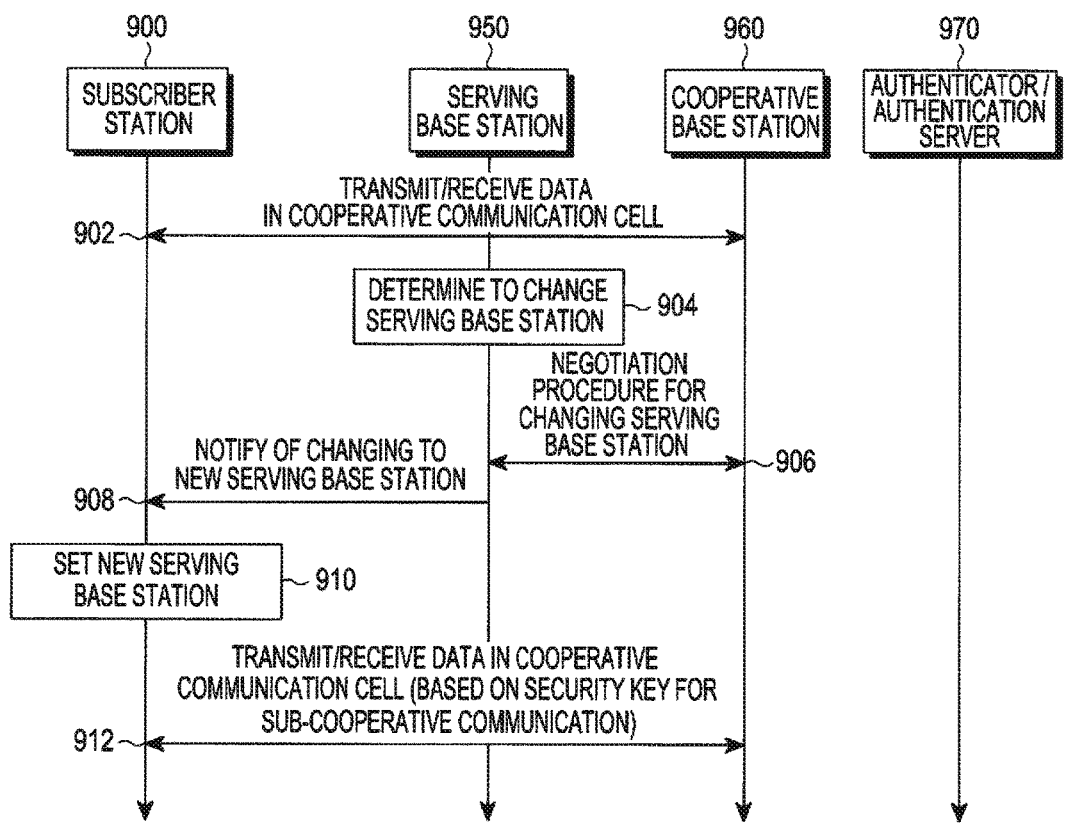
FIG. 9 is a signal flow diagram illustrating a procedure for managing a security key of a subscriber station in a process of changing the serving base station of the cell that provides the cooperative communication according to the first and second embodiments of the present disclosure.

FIG. 9 is a signal flow diagram illustrating a procedure for managing a security key of a subscriber station in a process of changing the serving base station of the cell according to the first and second embodiments of the present disclosure.

Referring to FIG. 9, in operation 902, a subscriber station 900 performs data transmission/reception through a cell configured with a serving base station 950 and a cooperative base station 960. At this time, the transmitted/received data is encrypted by using a security key for cooperative communication of the serving base station 950.

In operation 904, the serving base station 950 discontinues serving as a serving base station in the cell that provides the cooperative communication for the subscriber station 900, and determines that another member base station is to serve as a serving base station of the subscriber station 900. At this time, the determination of changing the serving base station is made in view of a signal measurement result that the subscriber station reports, a service load of the serving base station 950, and the like. For example, suppose the serving base station 950 selects the cooperative base station 960 as a new serving base station of the subscriber station 900. Then, in operation 906, the serving base station 950 performs a procedure for serving base station change negotiation with the cooperative base station 960. In operation 908, the serving base station 950 notifies the subscriber station 900 that the cooperative base station 960 is determined as a new serving base station. In operation 910, the subscriber station 900 sets the cooperative base station 960 as a new serving base station, and the serving base station 950 as a cooperative base station.

Thereafter, in operation 912, the subscriber station 900 performs data transmission/reception in the cell in which the serving base station 950 serves as a cooperative base station and the cooperative base station 960 serves as a serving base station. At this time, all the transmitted/received data is encrypted with the security key for sub-cooperative communication reserved for the cooperative base station 960. It is assumed that the security key for the sub-cooperative communication is generated and reserved through the procedure of FIGS. 3 and 4 according to the first embodiment of the present disclosure and the procedure of FIGS. 6 and 8 according to the second embodiment of the present disclosure. Thus, repetitive descriptions of the procedures for generating and reserving the security key for the sub-cooperative communication will be omitted.

—Third Embodiment—

Hereinafter, in the third embodiment of the present disclosure, a subscriber station sets a security key for a security link, generated for authenticating and encrypting the security link with a serving base station, as a security key for sub-cooperative communication in a cell that provides cooperative communication for the subscriber station. When the serving base station is changed to a new serving base station, the subscriber station performs, through the serving base station, a procedure for changing to the new serving base station to generate a security key for cooperative communication of the new serving base station. Hereinafter, based on control of the new serving base station, data transmitted/received in the cell is encrypted by using the security key for the cooperative communication of the new serving base station. At this time, the security key for the cooperative communication of the new serving base station is generated through the same procedure as that for generating the security key for the sub-cooperative communication of the cooperative base station according to the first and second embodiments of the present disclosure. Hereinafter, in descriptions according to the third embodiment of the present disclosure, a procedure of generating the security key for the sub-cooperative communication according to the second embodiment of the present disclosure will be illustrated.

Figure 10A:
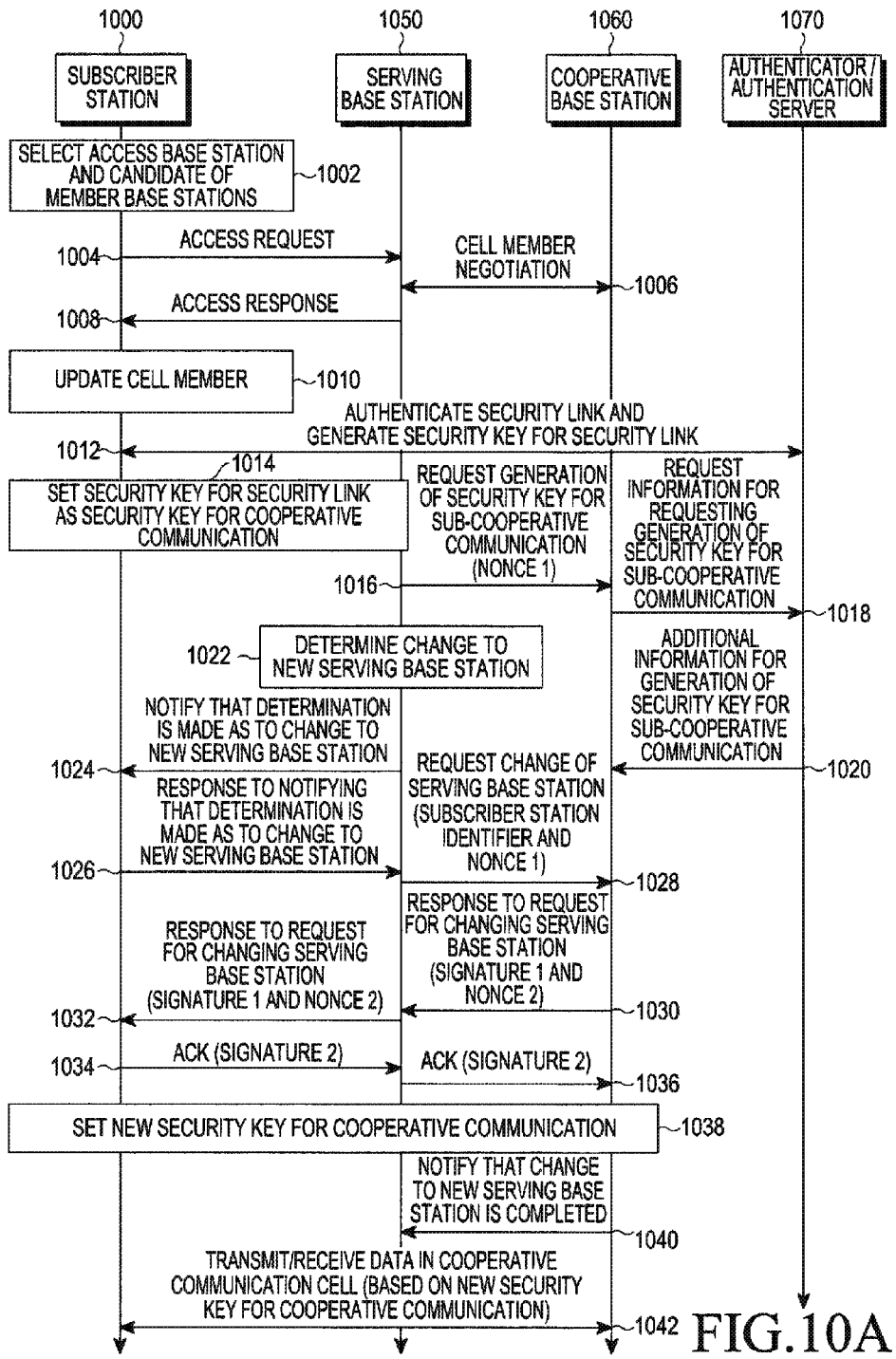
FIG. 10A is a signal flow diagram illustrating a procedure for managing a security key of a subscriber station in a process of changing a serving base station of a cell that provides cooperative communication according to a third embodiment of the present disclosure.

FIG. 10A is a signal flow diagram illustrating a procedure for managing a security key of a subscriber station in a process of changing a serving base station of a cell that provides cooperative communication according to a third embodiment of the present disclosure.

Referring to FIG. 10A, since operations of a subscriber station 1000, a serving base station 1050, a cooperative base station 1060, and an authenticator/authentication server 1070 in operations 1002 to 1020 are the same as those of the subscriber station 600, the serving base station 650, the cooperative base station 660, and the authenticator/authentication server 670 in operations 602 to 620 according to the second embodiment of the present disclosure, descriptions of them will be omitted.

In operation 1022, the serving base station 1050 discontinues serving as a serving base station of the cell, and determines that another member base station is to serve as the serving base station of the cell. At this time, the determination of changing to a new serving base station is made in view of a signal measurement result that the subscriber station 1000 reports, i.e., a service load of the serving base station 1050, and the like. For example, suppose the serving base station 1050 selects the cooperative base station 1060, which is an existing member base station, as a new serving base station of the subscriber station 1000. As another example, the serving base station 1050 may also determine a new member base station but not the member base stations of the cell as the new serving base station. In operation 1024, the serving base station 1050 notifies the subscriber station 1000 that the cooperative base station 1060 is to be changed to the new serving base station. Then, in operation 1026, the subscriber station 1000 sets the cooperative base station as the new serving base station, and the serving base station 1050 as a cooperative base station in a cell member base station list. Thereafter, the subscriber station 1000 transfers, to the serving base station 1050, a response to the notification which includes NONCE 1 and information on the cooperative base station 1060. At this time, the response includes NONCE 1 information for generating a security key for cooperative communication, for communication in the cell when the cooperative base station 1060 serves as the serving base station. NONCE 1 is a value that is arbitrarily generated by the subscriber station 1000 to be used for configuring the security key for the cooperative communication of the cooperative base station 1060, and is a parameter that is used for preventing a session replay attack.

In operation 1028, the serving base station 1050 transmits, to the cooperative base station 1060, a serving base station change request requiring that the cooperative base station 1060 is to serve as a serving base station in the cell of the subscriber station 1000. The serving base station change request includes an identifier of the subscriber station 1000 and NONCE 1.

In operation 1030, the cooperative base station 1060 configures a security key for cooperative communication, which will be used for communication with the subscriber station 1000 in the cell, by using additional information, the identifier of the subscriber station, and NONCE 1. The additional information corresponds to information acquired from the authenticator/authentication server 1070 in operation 1020. For example, the additional information corresponds to a session key between the subscriber station 1000 and the corresponding cooperative base station 1060, and authentication path information of the subscriber station authentication for the cooperative base station 1060. The cooperative base station 1060 generates Signature 1 that is a security signature based on the configured security key for the cooperative communication, and NONCE 2 that is an arbitrary value. NONCE 2 is a parameter that is arbitrarily generated to prevent the session replay attack for the subscriber station 1000 in the cooperative base station 1060. The cooperative base station 1060 transfers, to the serving base station 1050, a response to the request for changing the serving base station, including Signature 1 and NONCE 2. In operation 1032, the serving base station 1050 transmits, to the subscriber station 1000, the response to the request for changing the serving base station, including Signature 1 and NONCE 2. In operation 1034, the subscriber station 1000 configures a new security key for the cooperative communication for the new cooperative base station, i.e., the cooperative base station 1060, by using the authentication path of the subscriber station 1000 for the cooperative base station 1060 and NONCE 2. The subscriber station 1000 generates Signature 2 that is a security signature based on the new security key for the cooperative communication, and transfers, to the serving base station 1050, an acknowledgement (ACK), including Signature 2, for the response to the request for changing the serving base station. Then, in operation 1036, the serving base station 1050 transfers, to the cooperative base station 1060, the ACK, including Signature 2, for the response to the request for changing the serving base station. Thereafter, in operation 1038, the subscriber station 1000 and the cooperative base station 1060 set the security key for the cooperative communication, generated through operations 1016 to 1036, as a new security key for the cooperative communication for data encryption in the cell of the subscriber station 1000. In operation 1040, the cooperative base station 1060 notifies the serving base station 1050 that changing to the new serving base station is completed.

Thereafter, in operation 1042, the subscriber station 1000 performs data transmission/reception in the cell in which the serving base station 1050 is configured as a cooperative base station and the cooperative base station 1060 is configured as a new serving base station. At this time, all the transmitted/received data is encrypted with the new security key for the cooperative communication, which has been set for the cooperative base station 1060 through operations 1034 to 1038.

Figure 10B:
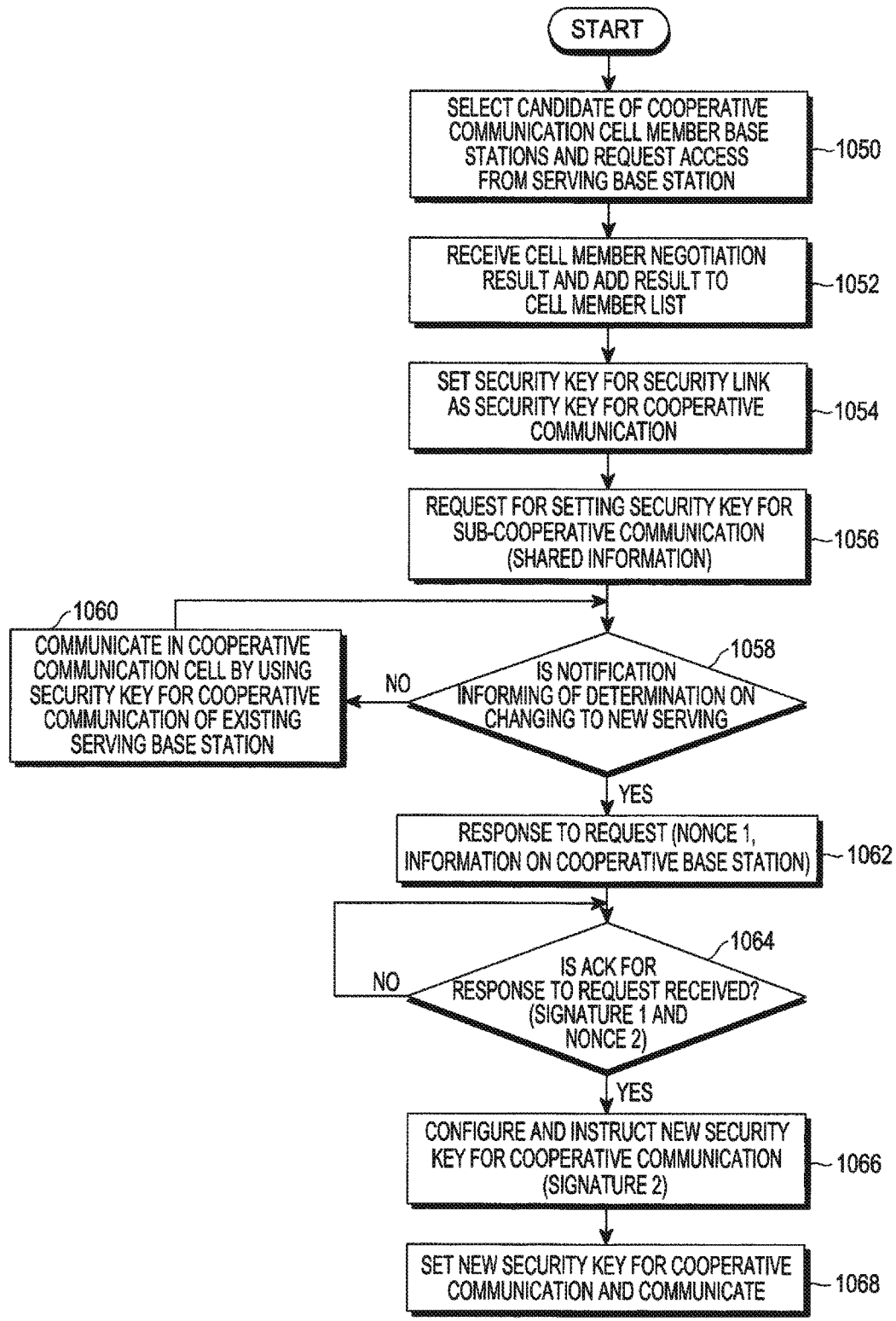
FIG. 10B is a flowchart illustrating an operation of a subscriber station according to a third embodiment of the present disclosure.

FIG. 10B is a flowchart illustrating an operation of a subscriber station according to a third embodiment of the present disclosure.

Referring to FIG. 10B, since operations of a subscriber station 1000 in operations 1050 to 1056 are the same as those of the subscriber station in operations 800 to 806 of FIG. 8A according to the second embodiment of the present disclosure, descriptions of them will be omitted.

In operation 1058, the subscriber station determines whether a notification, informing that a determination is made as to changing to a new serving base station, has been received from a serving base station. When it is determined that the notification, informing that change to the new serving base station was determined, has not been received, the subscriber station transmits/receives data, encrypted by using the security key for the cooperative communication of the serving base station, to/from the member base stations in the cell, in operation 1060, in which the security key for the cooperative communication has been set with the security key for the security link with the serving base station set in operation 1054. In operation 1058, the subscriber station waits for reception of the notification informing that the change to the new serving base station was determined.

When it is determined that the notification, informing that the change to the new serving base station was determined, has been received, the subscriber station generates NONCE 1 for configuring the security key for the cooperative communication for the new serving base station, in operation 1062. The subscriber station transfers a response to the notification, including NONCE 1 and information of the cooperative base station, to the serving base station. The request for changing to the new serving base station includes the information of the cooperative base station selected as the new serving base station.

In operation 1064, the subscriber station determines, through the serving base station, reception of a response to the request for changing the serving base station, including arbitrary NONCE 2 and Signature 1 that is a security signature based on the security key for the cooperative communication which the cooperative base station changed to the new serving base station has generated. When it is determined that the response to the request for changing the serving base station has not been received, the subscriber station stands by until the response to the request for changing the serving base station is received.

When it is determined that the response to the request for changing the serving base station has been received, in operation 1066, the subscriber station configures a new security key for the cooperative communication for the cooperative base station by using NONCE 2 and a subscriber station authentication path for the cooperative base station, and generates Signature 2 that is a security signature based on the new security key for the cooperative communication. The subscriber station transfers an instruction for changing to the new serving base station, including Signature 2, to the cooperative base station through the serving base station.

In operation 1068, the subscriber station sets the security key for the cooperative communication with the cooperative base station, which has been generated in operation 1066, as a new security key for cooperative communication for cell communication through which the cooperative base station operates as the new serving base station. Thereafter, the subscriber station transmits/receives data, encrypted with the new security key for the cooperative communication, to/from the member base stations in the cell in which the cooperative base station has been set as the new serving base station.

Figure 10C:
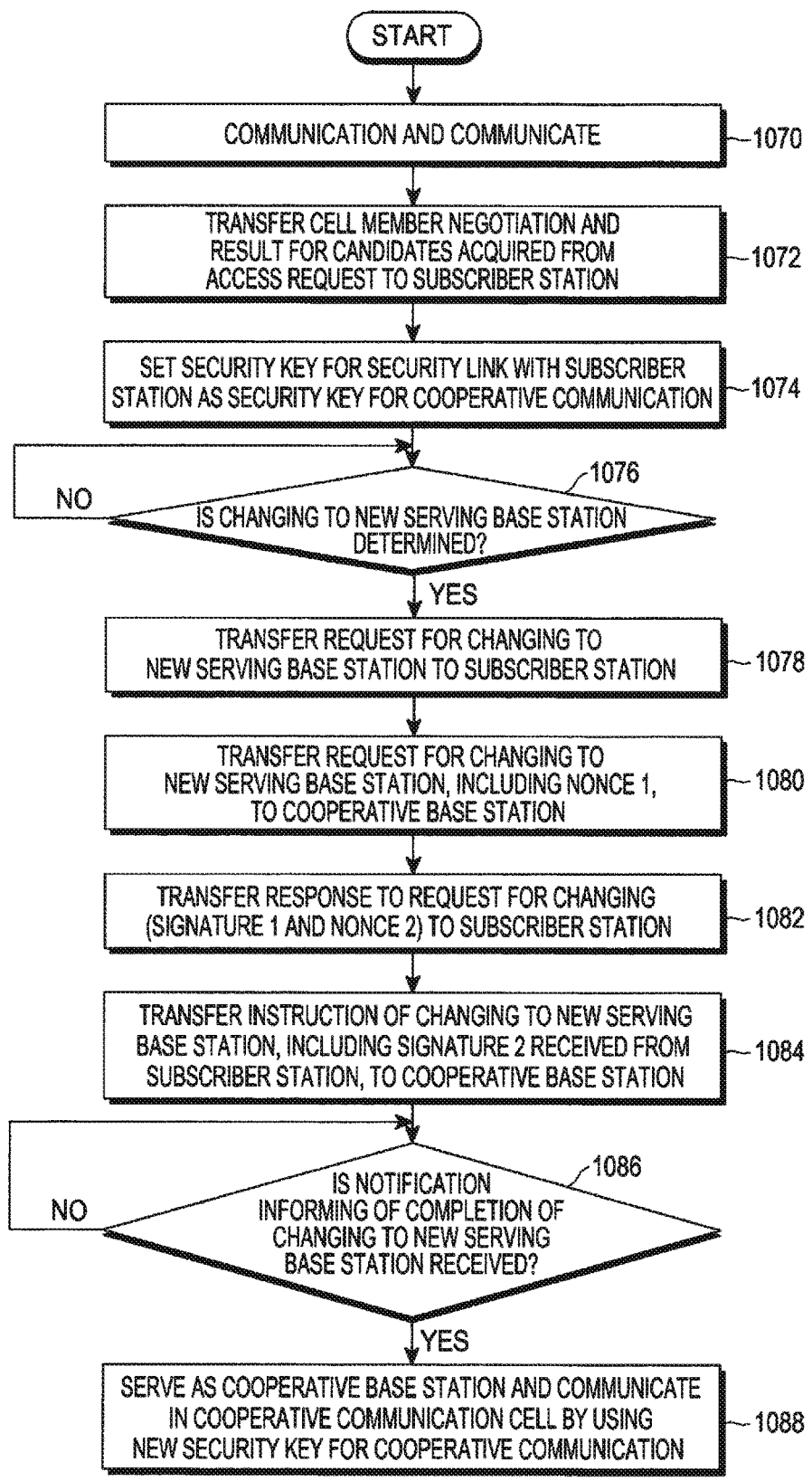
FIG. 10C is a flowchart illustrating an operation of a serving base station according to a third embodiment of the present disclosure.

FIG. 10C is a flowchart illustrating an operation of a serving base station according to a third embodiment of the present disclosure.

Referring to FIG. 10C, in operation 1070, the serving base station receives an access request from a subscriber station. In operation 1072, the serving base station performs a procedure for cell member negotiation with base stations corresponding to candidates that will configure a cell that provides cooperative communication for the subscriber station, which has been acquired through the access request, and transfers a result of the negotiation procedure to the subscriber station.

In operation 1074, the serving base station generates a security link with the subscriber station, and generates a security key for the security link for authenticating and encrypting the security link. The serving base station sets the encryption key for the security link as a security key for the cooperative communication for communication in the cell.

In operation 1076, the serving base station determines a change to a new serving base station in view of a signal measurement result that the serving base station reports. Suppose it is determined that a cooperative base station is to be changed to the new serving base station. Then, in operation 1078, the serving base station transfers a notification, informing that the change to the new serving base station is determined, to the subscriber station.

The notification includes information on the cooperative base station and NONCE 1 information for generating the security key for the cooperative communication in the cell when the cooperative base station serves as a serving base station. NONCE 1 is a value that is arbitrarily generated by the subscriber station to be used for configuration of the security key for the cooperative communication with the cooperative base station, and is a parameter that is used for preventing a session replay attack.

Then, in operation 1080, the serving base station receives a response to the notification from the subscriber station, and transfers the response to the cooperative base station.

Thereafter, in operation 1082, the serving base station transfers, to the subscriber station, the response to the request for changing to the serving base station, including arbitrary NONCE 2 and Signature 1 that is a security signature based on the security key for the cooperative communication which the cooperative base station has generated. In operation 1084, the serving base station transfers, to the cooperative base station, an acknowledgement (ACK) of the response to the request for the changing of the serving base station, including Signature 2 that is a security authentication certificate based on the new security key for the cooperative communication generated by using a subscriber station authentication path for the cooperative base station and NONCE 1, which has been received from the subscriber station.

Thereafter, in operation 1086, the serving base station determines whether a notification, informing that changing to the new base station was completed, has been received from the cooperative base station. When it is determined that the notification has not been received, the serving base station stands by until the notification is received.

When it is determined that the notification, informing that changing to the new base station was completed, has been received from the cooperative base station, in operation 1088, the serving base station serves as a cooperative base station in the cell, and transmits/receives data, encrypted with the security key for the cooperative communication with the cooperative base station, to/from the subscriber station in the cell.

Figure 10D:
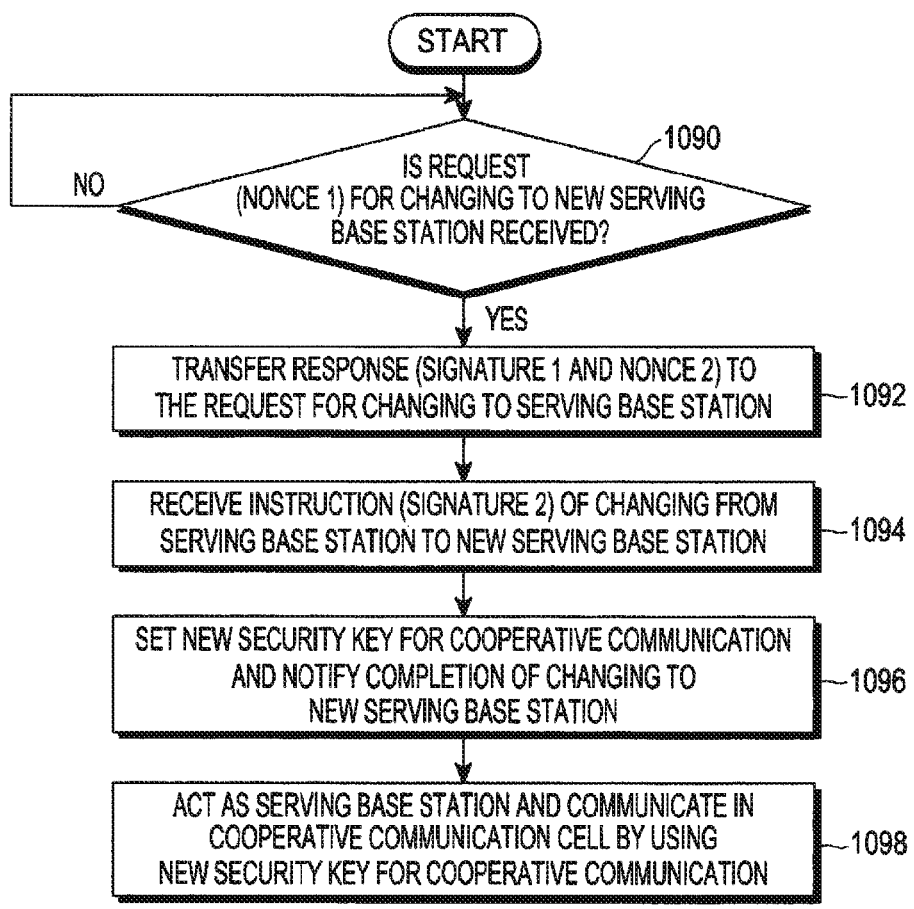
FIG. 10D is a flowchart illustrating an operation of a cooperative base station according to a third embodiment of the present disclosure.

FIG. 10D is a flowchart illustrating an operation of a cooperative base station according to a third embodiment of the present disclosure. The cooperative base station transmits/receives data encrypted with a security key for cooperative communication between a subscriber station and a serving base station in a cell. The security key for the cooperative communication is a security key for a security link set between the subscriber station and the serving base station. Suppose the cooperative base station is determined as a new serving base station by the serving base station.

Referring to FIG. 10D, in operation 1090, the cooperative base station waits for reception of a response to a notification informing that changing to a new serving base station was determined, in which the response includes a subscriber station identifier and NONCE 1 which the subscriber station has transmitted through the serving base station. NONCE 1 is a value that is arbitrarily generated by the subscriber station to be used for configuration of the security key for the cooperative communication with the cooperative base station, and is a parameter that is used for preventing a session replay attack.

When receiving, from the serving base station, a request for changing to the new serving base station, in operation 1092, the cooperative base station configures the security key for the cooperative communication in the cell, by using additional information acquired from an authenticator/authentication server, the subscriber station identifier, and NONCE 1. The cooperative base station generates Signature 1 that is a security signature based on the security key for the cooperative communication and arbitrary NONCE 2. The cooperative base station transfers, to the serving base station, a response to the request for changing which includes Signature 1 and NONCE 2.

Thereafter, in operation 1094, the cooperative base station receives, through the serving base station, an acknowledgement (ACK) of the response to the request for changing to the new serving base station, in which the ACK includes Signature 2. Signature 2 is a security signature based on the new security key for the cooperative communication which has been generated based on the subscriber station authentication path for the cooperative base station and NONCE 2 which the subscriber station will use when the cooperative base station is changed to a new base station. Then, in operation 1096, the cooperative base station sets the security key for the cooperative communication for the cooperative base station as the new security key for the cooperative communication, and notifies the serving base station that the changing to the new serving base station is completed. In operation 1098, the cooperative base station operates as a new serving base station of the subscriber station, and transmits/receives data, encrypted by using the new security key for the cooperative communication, to/from the subscriber station.

—Fourth Embodiment—

Like the first embodiment, in the fourth embodiment of the present disclosure, a subscriber station generates, for respective member base stations that configure a cell that provides cooperative communication thereto, seeds input when creating a security key for cooperative communication for communication in the cell. The generated seeds for the member base stations have different values. The subscriber station transfers the generated seeds to the corresponding member base stations. Then, a serving base station and cooperative base stations configuring the cell generate security keys for cooperative communication thereof, by using the seed received from the subscriber station.

However, the fourth embodiment of the present disclosure is different from the first embodiment in that data encrypted by using the security key for the cooperative communication generated for each of the member stations is transmitted/received during communication in the cell. Specifically, when communicating with the serving base station, the subscriber station transmits/receives, to/from the serving base station, data encrypted by using the security key for the cooperative communication generated by using the seed generated for the serving base station. When communicating with the cooperative base station, the subscriber station transmits/receives, to/from the serving base station, data encrypted by using the security key for the sub-cooperative communication generated by using the seed for the cooperative communication generated for the cooperative base station. When a new member base station is added in the cell of the subscriber station, the subscriber station generates a seed for the new member base station, and transfers the seed to the new member base station. When communicating with the new member base station, the subscriber station transmits/receives, to/from the new member base station, data encrypted by using a new security key for sub-cooperative communication generated by using the seed for the new member base station.

As described above, since the operations of the fourth embodiment of the present disclosure are the same as those of the first embodiment, except for data encryption in the case of communication in the cell, the fourth embodiment will be described with reference to the drawing of the first embodiment.

Hereinafter, a procedure for managing a security key of a subscriber station in a process of configuring a cell according to the fourth embodiment of the present disclosure will be described with reference to FIG. 3. Referring to FIG. 3, since operations of a subscriber station, a serving base station, a cooperative base station, and an authenticator/authentication server according to the fourth embodiment are the same as those of the subscriber station 300, the serving base station 350, the cooperative base station 360, and the authenticator/authentication server 370 according to the first embodiment of the present disclosure, descriptions of them will be omitted hereinafter. The seed of the serving base station 350 which the subscriber station 300 has generated in operation 314 has a different value from the seed of the cooperative base station 360 which the subscriber station 300 has generated in operation 326.

In operation 336, the subscriber station 300 performs data transmission/reception in the cell configured with the serving base station 350 and the cooperative base station 360. At this time, the data which the subscriber station 300 transmits/receives to/from the serving base station 350 is encrypted with a cell authentication key for cooperative communication of the serving base station 350, which has been configured through operations 318 and 320, by using the seed which the subscriber station 300 has generated for the serving base station 350 in operation 314. The data which the subscriber station 300 transmits/receives to/from the cooperative base station 360 is encrypted with a cell authentication key for cooperative communication of the cooperative base station 360, which has been configured through operations 330 to 334, by using the seed which the subscriber station 300 has generated for the cooperative base station 350 in operation 326.

Next, a procedure for managing a security key of a subscriber station in a process of re-configuring a cell that provides cooperative communication according to the fourth embodiment of the present disclosure will be described with reference to FIG. 4. Referring to FIG. 4, since operations of a subscriber station, a serving base station, a first cooperative base station, a second cooperative base station, and an authenticator/authentication server according to the fourth embodiment are the same as those of the subscriber station 400, the serving base station 450, the first cooperative base station 460, the second cooperative base station 470, and the authenticator/authentication server 480 in operations 402 to 424 according to the first embodiment of the present disclosure, descriptions of them will be omitted hereinafter. The seed of the second cooperative base station 470 which the subscriber station 400 has generated in operation 416 has a different value from the seeds which the subscriber station 400 has generated for the serving base station 450 and the first cooperative base station 460. Suppose security keys for cooperative communication of the serving base station 450 and the first cooperative base station 460 are set based on the procedure illustrated in FIG. 3.

Thereafter, in operation 426, data that the subscriber station 400 transmits/receives to/from the first cooperative base station 460 is encrypted with a cell authentication key for cooperative communication, which has been configured through operations 318 and 320 by using the seed of the serving base station 450 generated in operation 314. Data that the subscriber station 400 transmits/receives to/from the first cooperative base station 460 is encrypted with a cell authentication key for cooperative communication, which has been configured through operations 330 and 336 by using the seed of the first cooperative base station 460 generated in operation 326. Data that the subscriber station 400 transmits/receives to/from the second cooperative base station 470 is encrypted with an authentication key for cooperative communication, which has been configured through operations 420 and 422 by using the seed of the second cooperative base station 470 generated in operation 416.

Hereinafter, a procedure for managing a security key of a subscriber station in a process of changing a serving base station of a cell that provides cooperative communication according to the fourth embodiment of the present disclosure will be described with reference to FIG. 9. Suppose a serving base station 950 configuring a cell that provides cooperative communication for a subscriber station 900 is changed to a new serving base station 960. As described above with reference to FIG. 3, suppose a security key for cooperative communication is set for the serving base station and a cooperative base station.

Referring to FIG. 9, since operations of a subscriber station, a serving base station, a cooperative base station, and an authenticator/authentication server according to the fourth embodiment are the same as those of the subscriber station 900, the serving base station 950, the cooperative base station 960, and the authenticator/authentication server 970 in operations 902 to 912 of FIG. 9, descriptions of them will be omitted hereinafter.

In operation 912, the subscriber station 900 performs data transmission/reception in a cell reconfigured through changing the existing serving base station 950 to a cooperative base station, and the existing cooperative base station 960 to a serving base station. Data that the subscriber station 900 transmits/receives to/from the serving base station 950 changed to the cooperative base station is encrypted with a security key for cooperative communication which has been configured through operations 318 and 320 by using a seed generated for the serving base station 950 in operation 314 of FIG. 3. Data that the subscriber station 900 transmits/receives to/from the cooperative base station 960 changed to the new serving base station is encrypted with a security key for cooperative communication which has been configured through operations 330 and 332 by using a seed generated for the cooperative base station 960 in operation 326 of FIG. 3.

As described above, in the fourth embodiment of the present disclosure, the subscriber station configures a security key for cooperative communication for each of the member base stations by using a seed differently generated for the member base station. It has been illustrated that the member base stations configuring the cell that provides the cooperative communication for the subscriber station transmit/receive data encrypted with the security key for the cooperative communication of the corresponding member base station.

As another example, a case of configuring the cell security key for the cooperative communication based on the general authentication key as illustrated in FIG. 6 according to the second embodiment of the present disclosure may also be applied to a scenario according to the fourth embodiment, in which the subscriber station uses the security key for the cooperative communication generated for the member base station for data to transmit/receive to/from the cell member base station.

As described above, the fourth embodiment of the present disclosure is different from the first embodiment in that, after the security key for the cooperative communication is generated for each of the member base stations by using the seed which has been generated by the subscriber station to have a different value for the member base station according to the first embodiment of the present disclosure or based on the general authentication key according to the second embodiment of the present disclosure, the data transmitted/received during the actual communication in the cell is encrypted by using the different security keys for the cooperative communication for the member base stations.

Thus, since only the security keys for the cooperative communication used in the actual data transmission/reception are different from each other in the operations of the respective member base stations according to the first embodiment of the present disclosure in FIGS. 5A to 5C, a description of the operation of the respective member base stations will be omitted. In the same way, since only the cell security keys used in the actual data transmission/reception are different from each other even in the operations of the respective member base stations according to the second embodiment of the present disclosure in FIGS. 8A to 8C, a description of the operation of the respective member base stations will be omitted.

—Fifth Embodiment—

Hereinafter, in the fifth embodiment of the present disclosure, a subscriber station generates a seed offset input in a case of generating a security key for cooperative communication for communication in a cell, for each of the member base stations configuring the cell that provides a cooperative service to the subscriber station. The seed offsets generated for the respective member stations are different from each other. The subscriber station transfers the generated seed offset to the corresponding member base station. A serving base station and cooperative base stations configuring the cell generate a security key for cooperative communication thereof by using the seed offset received from the subscriber station. Thereafter, data transmitted/received between the subscriber station and the member base stations of the subscriber station in the cell, for example, may be encrypted based on the security key for the cooperative communication generated between the subscriber station and the serving base station. As another example, the data may be encrypted by using the security key for the cooperative communication differently generated for each of the member base stations.

Figure 11:
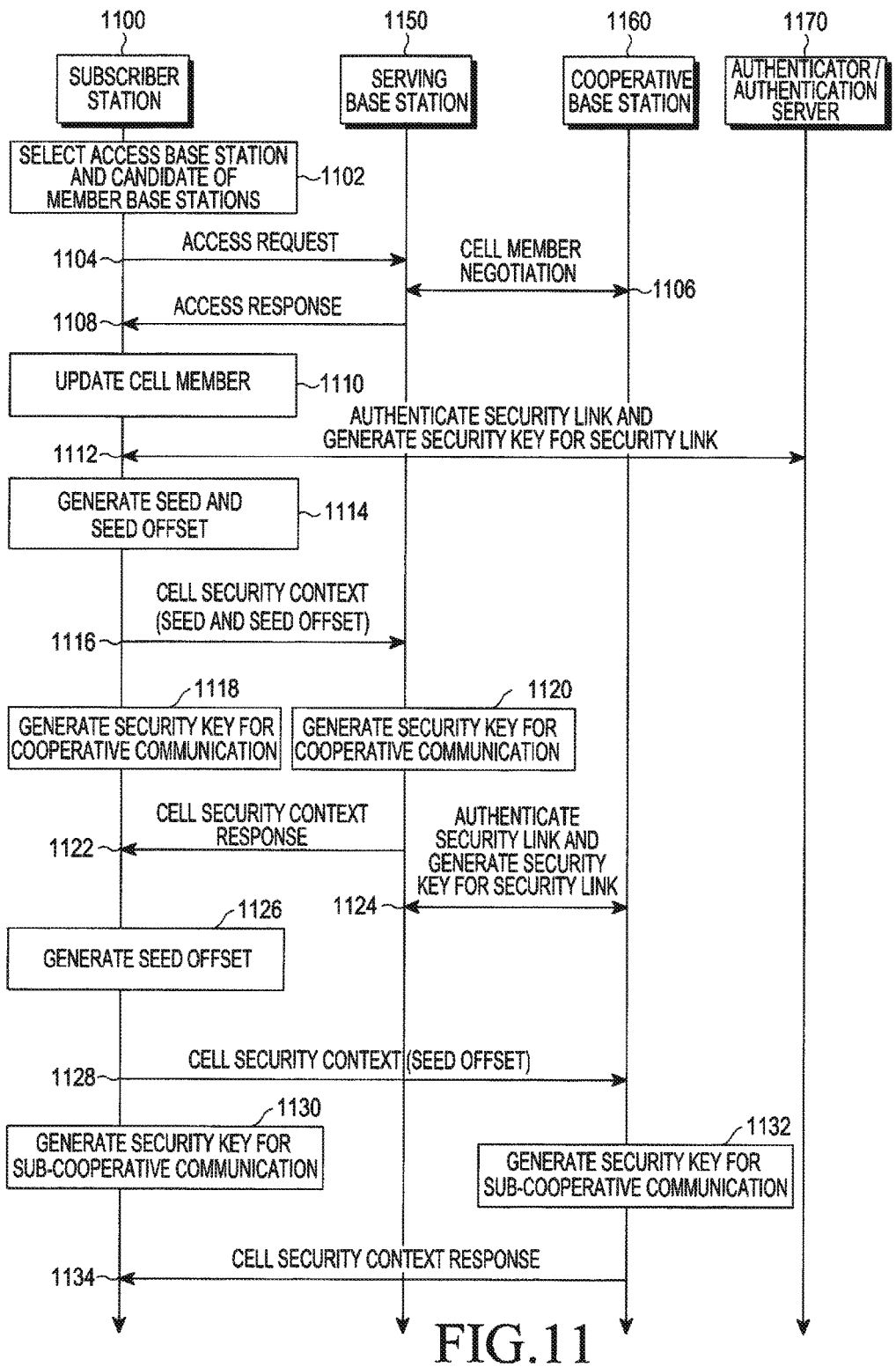
FIG. 11 is a signal flow diagram illustrating a procedure for managing a security key of a subscriber station in a process of configuring a cell that provides cooperative communication according to a fifth embodiment of the present disclosure.

FIG. 11 is a signal flow diagram illustrating a procedure for managing a security key of a subscriber station in a process of configuring a cell that provides cooperative communication according to a fifth embodiment of the present disclosure.

Referring to FIG. 11, since operations of a subscriber station 1100, a serving base station 1150, a cooperative base station 1160, and an authenticator/authentication server 1170 in operations 1102 to 1112 are the same as those of the subscriber station 300, the serving base station 350, the cooperative base station 360, and the authenticator/authentication server 370 in operations 302 to 312 of FIG. 3, descriptions of them will be omitted.

In operation 1114, the subscriber station 1100 generates a seed in order to configure a security key for cooperative communication which will be used during communication in a cell that provides the cooperative communication. The seed according to the fifth embodiment of the present disclosure is generated as a value that all member base stations configuring the cell of the subscriber station 1100 share in the subscriber station 1100. The seed may be changed when an arbitrary member base station is withdrawn from the cell. Further, in operation 1114, the subscriber station generates a seed offset for the serving base station 1150. The seed offset is a parameter that the subscriber station 1100 arbitrarily generates such that the member base stations of the cell have different values.

In operation 1116, the subscriber station 1100 transfers a cell security context including the seed and the seed offset to the serving base station 1150. At this time, the seed is transferred through a security link generated in operation 1112. Then, in operations 1118 and 1120, the subscriber station 1100 and the serving base station 1150 configure a security key for cooperative communication, which will be used for the communication in the cell, by using the seed and the seed offset generated in operation 1114. The security key for the cooperative communication is configured through Equation 3 or Equation 4 below.

$$\text{Security key for cooperative communication} = \text{Dot16KDF}(\text{seed}, \text{MSID}|\text{Seed offset}|\text{"cell key"}, \text{cell\_key\_length}) \quad [\text{Eqn. 3}]$$

$$\text{Security key for cooperative communication} = \text{Dot16KDF}(\text{seed}, \text{MSID}|\text{BSID}-|\text{seed offset}|\text{"cell key"}, \text{cell\_key\_length}) \quad [\text{Eqn. 4}]$$

Here, Seed denotes a seed that the subscriber station 1100 has generated in operation 1114, BSID denotes a base station identifier, MSID denotes a subscriber station identifier, Seed offset denotes a seed offset that the subscriber station 1100 has generated in operation 1114, "cell key" is a character string denoting an encryption key for cooperative communication, and Dot16KDF is an algorithm for generating an authentication key of cell_key_length bit through an input of a pairwise master key, a cell seed, a subscriber station identifier, Seed offset, and "cell key" character string, or an input of a cell seed, a subscriber station identifier, a base station identifier, Seed offset, and "cell key" character string.

In operation 1122, the serving base station 1150 transmits, to the subscriber station 1100, a cell security context response encrypted by using the security key for the cooperative communication. In operation 1124, the serving base station 1150 transmits the seed to the cooperative base station 1460 which is a member base station of the cell.

In operation 1126, the subscriber station 1100 generates a seed offset for the cooperative base station 1160 which is different from a seed offset of other member base stations. In operation 1128, the subscriber station 1100 transfers a cell security context including the seed offset to the cooperative base station 1160. The seed offset may be transmitted through piggy back or scrambling of an upward link signal that is first transmitted to the cooperative base station 1160. The upward link signal includes a ranging preamble, a ranging message, and a beam forming message. In operations 1130 and 1132, the subscriber station 1100 and the cooperative base station 1160 configure a security key for sub-cooperative communication for the cooperative base station 1160, by using the seed, the seed offset, Equation 3, or Equation 4. In operation 1134, the cooperative base station 1160 transfers a cell security context response encrypted with the generated cell security key for the sub-cooperative communication to the subscriber station 1100.

Thereafter, the subscriber station 1100 performs data transmission/reception with the member base stations in the cell that provides the cooperative communication thereof. For example, the subscriber station 1100 encrypts data transmitted/received during communication with the member base stations, by using the security key for the cooperative communication of the serving base station 1150 which has been generated in operations 1118 and 1120. As another example, the data, which is transmitted/received to/from the member base stations in the cell, is encrypted by using the security key for the cooperative communication which has been generated for each of the member stations. Specifically, the data transmitted/received between the subscriber station 1100 and the serving base station 1150 is encrypted with the security key for the cooperative communication which has been generated in operations 1118 and 1120. The data transmitted/received between the subscriber station 1100 and the cooperative base station 1160 is encrypted with the security key for the sub-cooperative communication which has been generated in operations 1130 and 1132.

When a new member base station is added to the cell, the subscriber station 1100 generates a seed offset for the new member base station differently from other member base stations, and transfers the seed offset to the new member base station. Then, the new member base station generates the security key for the sub-cooperative communication by using the seed offset, Equation 3, or Equation 4. Thereafter, data transmitted/received between the subscriber station and the new member base station in the cell is encrypted by using the security key for the sub-cooperative communication which has been generated by using the seed offset of the new member base station, in a case where data is encrypted for each of the member base stations, by using the security key for the cooperative communication.

In a case where data transmitted/received in the cell is encrypted based on the security key for the cooperative communication of the serving base station, when the serving base station of the cell is changed to the new serving base station, data encrypted by using the security key for the sub-cooperative communication which has been generated by using the seed offset of the new member base station is transmitted/received.

Operations of the subscriber station, the serving base station, and the cooperative base station according to the fifth embodiment of the present disclosure are similar to those of the subscriber station, the serving base station, and the cooperative base station according to the first embodiment of the present disclosure in FIGS. 5A to 5C. However, in the fifth embodiment of the present disclosure, as described above, the procedure for generating the security key and the encryption key for the security link is not individually performed, the data is transmitted through the piggy back or the scrambling of the upward link signal that is first transmitted to the cooperative base station.

The subscriber station generates a seed with a value shared with all the member base stations, and generates a different seed offset for each of the member base stations to transfer the generated seed offset to the corresponding member base station. The subscriber station and the member base stations generate the security key for the cooperative communication through the seed offset received from the subscriber station, Equation 3, or Equation 4.

In the embodiments of the present disclosure, subscriber station negotiation information and security key information of the subscriber station including the seed and the seed offset which is transmitted/received between the serving base station and the cooperative base station are transferred through the security link generated between the serving base station and the cooperative base station. The security link is encrypted through a security key for cooperative communication between the serving base station and the cooperative base station, which has been generated when corresponding base stations are installed and a connection between the base stations is set.

Figure 12A:
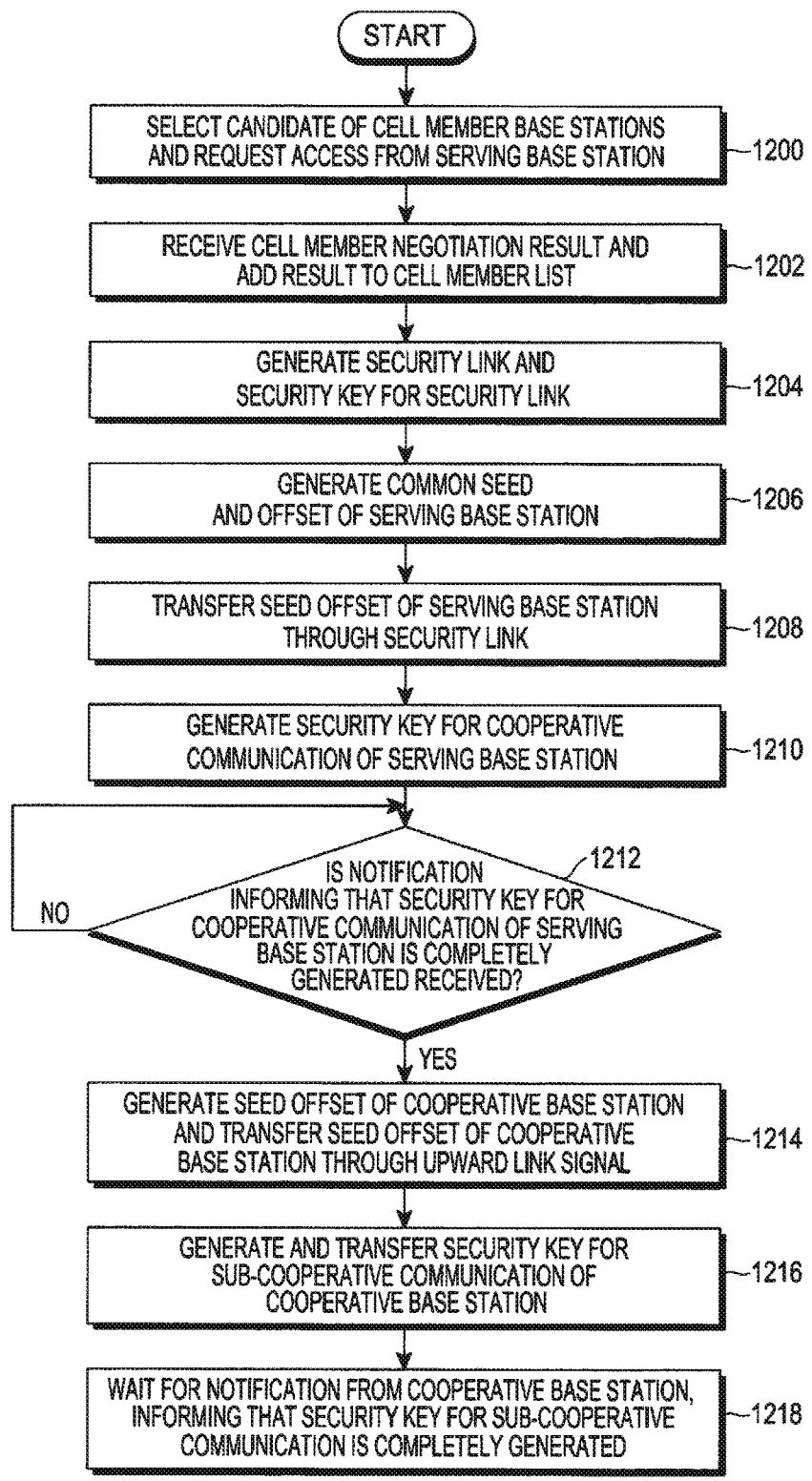
FIG. 12A is a flowchart illustrating an operation of a subscriber station according to a fifth embodiment of the present disclosure.

FIG. 12A is a flowchart illustrating an operation of a subscriber station according to a fifth embodiment of the present disclosure.

Referring to FIG. 12A, in operation 1200, the subscriber station selects candidates of cell member base stations that provide cooperative communication thereto, and transfers an access request to the base station determined as a serving base station, among the candidates. The access request includes information on the base stations selected as the candidate. In operation 1202, the subscriber station receives a member cell negotiation result for the candidates from the serving base station. The subscriber station adds information on the cooperative base stations, which has been acquired through the member cell negotiation result, to a cell member list thereof. In operation 1204, the subscriber station generates a security link with the serving base station, and generates a security key for the security link for authenticating and encrypting the security link.

In operation 1206, the subscriber station generates a seed that the member base stations will commonly use and a seed offset of the serving base station, which are different from those of other member base stations. In operation 1208, the subscriber station transfers a cell security context, including the seed and the seed offset of the serving base station, to the serving base station through the security link.

In operation 1210, the subscriber station generates the security key for the cooperative communication by using the seed offset of the serving base station, Equation 3, or Equation 4.

In operation 1212, the subscriber station determines whether a notification, informing that the serving base station completely generates the security key for the cooperative communication, has been received from the serving base station. When it is determined that the notification has not been received, the subscriber station waits for reception of the notification. When it is determined that the notification has been received, in operation 1214, the subscriber generates a seed offset of the cooperative base station, and transfers the seed offset of the cooperative base station through an initial upward link signal. For example, after the serving base station completely generates the security key for the cooperative communication, the seed offset of the cooperative base station is generated. However, according to another embodiment, as soon as the serving base station generates the security key for the cooperative communication, the security key for the cooperative communication may be generated for each of the member base stations at the same time.

In operation 1216, the subscriber station generates a security key for sub-cooperative communication of the cooperative base station by using the seed offset of the cooperative base station and Equation 3 or Equation 4, and then waits for reception of a cell security context response from the cooperative base station in operation 1218.

Thereafter, during data transmission/reception in the cell, the subscriber station encrypts all data by using the security key for the cooperative communication of the serving base station, or data by using the security key for the cooperative communication which has been differently generated for each of the member base stations.

Figure 12B:
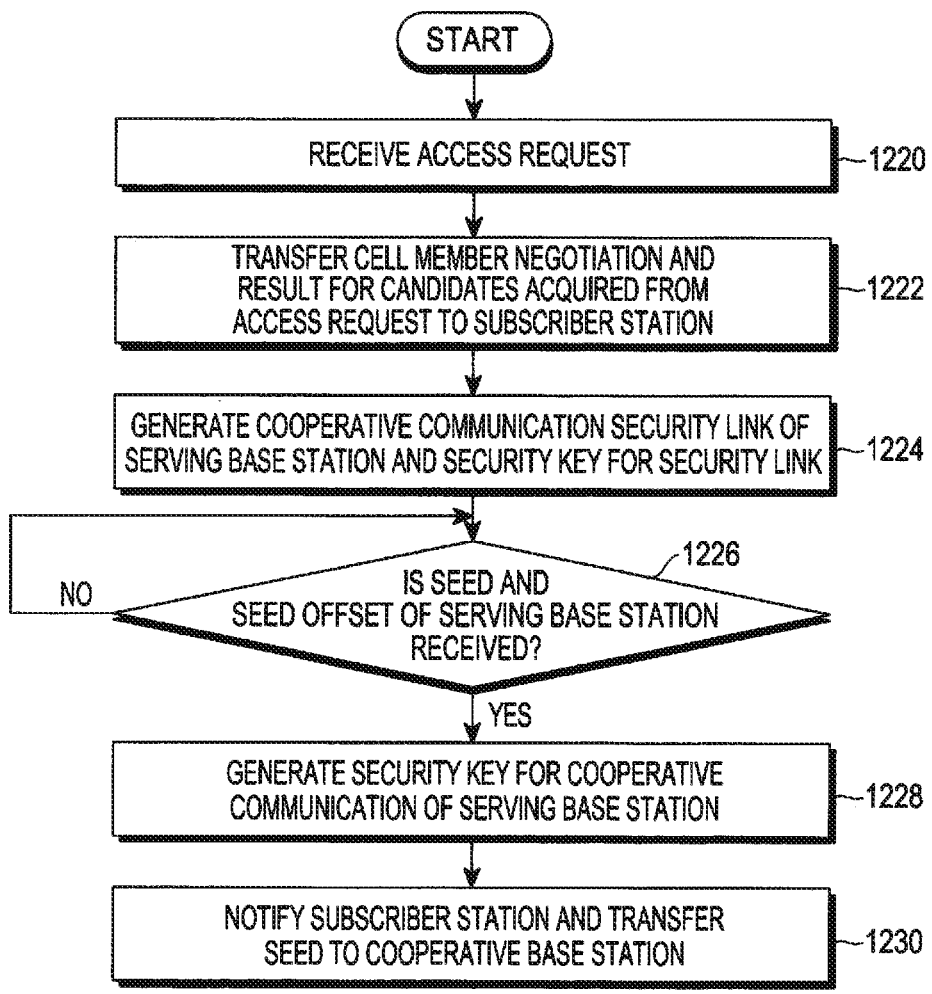
FIG. 12B is a flowchart illustrating an operation of a serving base station according to a fifth embodiment of the present disclosure.

FIG. 12B is a flowchart illustrating an operation of a serving base station according to a fifth embodiment of the present disclosure.

Referring to FIG. 12B, in operation 1220, the serving base station receives an access request from a subscriber station. In operation 1222, the serving base station performs a procedure for cell member negotiation, acquired from the access request, with base stations corresponding to candidates that are to configure a cell of the subscriber station, and transfers a result of the negotiation to the subscriber station.

In operation 1224, the serving base station generates a security link and a security key for the security link. In operation 1226, the serving base station monitors the security link set with the subscriber station, and determines whether a seed to be commonly used and a seed offset of the serving base station have been received from the subscriber station. When it is determined that the seed and the seed offset of the serving base station have not been received, the serving base station returns to operation 1226, and waits for reception of the seed and the seed offset of the serving base station. When it is determined that the seed and the seed offset of the serving base station have been received, in operation 1228, the serving base station generates the security key for the cooperative communication of the serving base station, by using the seed, the seed offset, and Equation 3 or Equation 4. In operation 1230, the serving base station transfers, to the subscriber station, a cell security context response informing the subscriber station that the security key of the cooperative communication of the serving base station has been generated. The serving base station transfers the seed to the cooperative base station.

Thereafter, when receiving the cell security context response from the cooperative base station, the serving base station transmits/receives data to/from the subscriber station by using the security key for the cooperative communication of the serving base station.

Figure 12C:
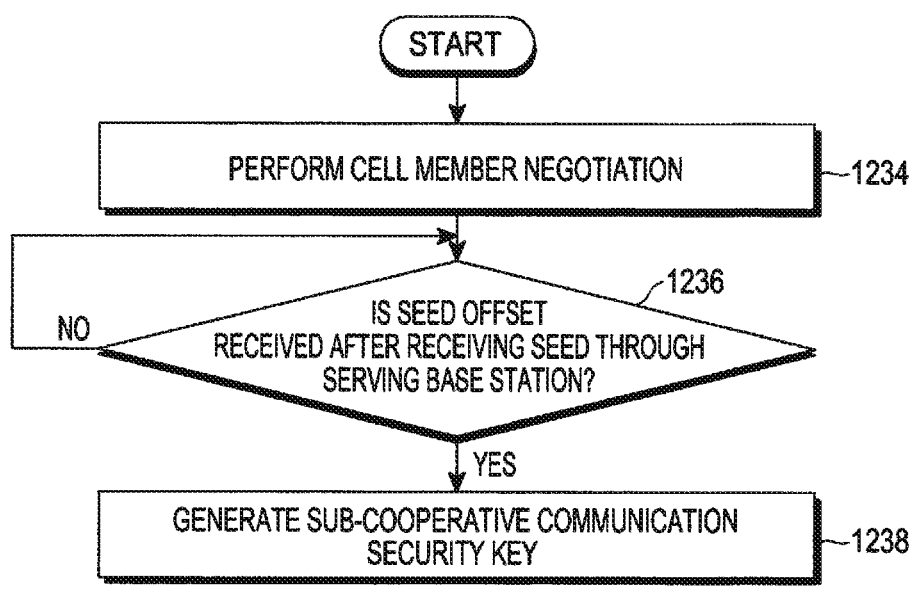
FIG. 12C is a flowchart illustrating an operation of a cooperative base station according to a fifth embodiment of the present disclosure.

FIG. 12C is a flowchart illustrating an operation of a cooperative base station according to a fifth embodiment of the present disclosure.

Referring to FIG. 12C, the cooperative base station performs cell member negotiation with a serving base station in operation 1234, when an attempt for the cell member negotiation is received from the serving base station configuring a cell of a specific subscriber station. Thereafter, in operation 1236, the cooperative base station receives a seed from the serving base station, and then determines whether a seed offset of the cooperative base station has been received from the subscriber station. When it is determined that the seed offset of the cooperative base station has not been received, the cooperative base station stands by until the seed offset of the cooperative base station is received.

When it is determined that the seed offset of the cooperative base station has been received, in operation 1238, the cooperative base station generates a security key for sub-cooperative communication of the cooperative base station by using the seed and the seed offset of the cooperative base station, and Equation 3 or Equation 4. The cooperative base station transfers a cell security context response to the subscriber station.

Thereafter, the cooperative base station performs communication in the cell under control of the serving base station, or transmits/receives data, encrypted by using the security key for the sub-cooperative communication of the cooperative base station, to/from the subscriber station.

Figure 13:
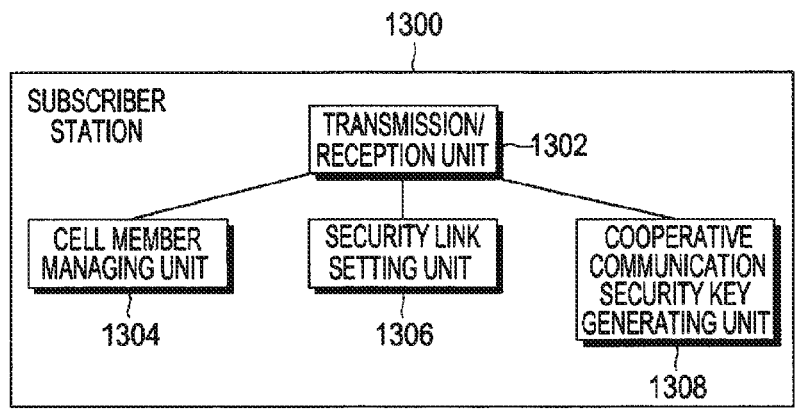
FIG. 13 is a block diagram illustrating a configuration of a subscriber station according to an embodiment of the present disclosure.

FIG. 13 is a block diagram illustrating a configuration of a subscriber station according to an embodiment of the present disclosure.

Referring to FIG. 13, the subscriber station 1300 includes a transmission/reception unit 1302, a cell member managing unit 1304, a security link setting unit 1306, and a cooperative communication security key generating unit 1308. While configurations of the subscriber station are differently illustrated in FIG. 13 according to operations classified by techniques proposed in the present disclosure, the configurations may be configured with a single unit or other sub-units through other embodiments.

The cell member managing unit 1304 manages member base stations, configuring a cell thereof acquired through a serving base station, in a cell member base station list. When receiving, from the serving base station, a notification informing of the changing to a new serving base station, the cell member managing unit 1304 updates the new serving base station to a serving base station and the existing serving base station to a cooperative base station, and manages the member base stations, in the cell member base station list.

According to the embodiments of the present disclosure, the security key generating unit 1306 generates an input value for generating a security key of the member base stations. According to the embodiment of the present disclosure, the security key generating unit 1306 generates a seed that the member base stations commonly use, and a seed or a seed offset that is set to a different value for the member base stations. Alternatively, the security key generating unit 1306 generates an input value for generating a seed security key based on a general authentication key. The security key generating unit 1306 generates the security key for the cooperative communication of the corresponding member base station, by using the seed and Equation 1 or Equation 2, according to the embodiments of the present disclosure. The security key generating unit 1306 generates the security key for the cooperative communication of the corresponding member base station, by using the seed offset and Equation 3 or Equation 4.

Thereafter, the transmission/reception unit 1302 transmits/receives data to/from the member base stations in the cell. The data may be encrypted by using the security key for the cooperative communication of the serving base station or the security key for the cooperative communication/the security key for the sub-cooperative communication classified for the member base stations, according to the embodiments of the present disclosure. Further, even when the serving base station is changed to a new serving base station, the data may be encrypted by using the security key for the cooperative communication of the serving base station or the security key for the cooperative communication/the security key for the sub-cooperative communication classified for the member base stations, according to the embodiments of the present disclosure.

Figure 14:
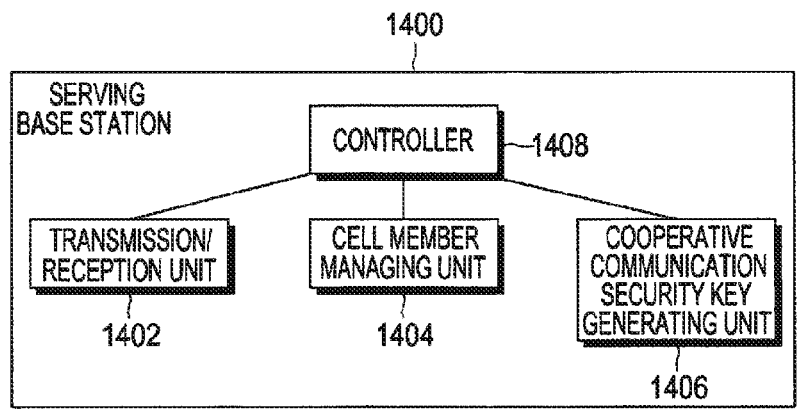
FIG. 14 is a block diagram illustrating a configuration of a serving base station according to an embodiment of the present disclosure.

FIG. 14 is a block diagram illustrating a configuration of a serving base station according to an embodiment of the present disclosure.

Referring to FIG. 14, the serving base station 1400 includes a transmission/reception unit 1402, a cell member negotiation unit 1404, a security key generating unit 1406, and a controller 1408. While configurations of the serving base station are differently illustrated in FIG. 14 according to operations classified by techniques proposed in the present disclosure, the configurations may be configured with a single unit or other sub-units through other embodiments.

The transmission/reception unit 1402 receives a seed or a seed offset from the subscriber station according to the embodiments of the present disclosure. At this time, the seed and the seed offset are set to a value different from that of member base stations, according to the embodiments of the present disclosure. Alternatively, the seed may also be set to a value that all the member base stations commonly use, according to another embodiment.

The cell member negotiation unit 1404 performs member cell negotiation with member base stations configuring a cell of the subscriber station, based on candidate base stations received from the subscriber station. The cell member negotiation unit 1404 determines the addition of a new member base station and changing to a new serving base station through a procedure for measuring a signal intensity of an adjacent cell. When it is determined that the new serving base station or the new member base station is to be added, the cell member negotiation unit 1404 performs a procedure for changing to the new serving base station, or cell member negotiation with the new member base station.

The security key generating unit 1406 generates the security for the cooperative communication of the serving base station 1400, by using the seed and the seed offset received from the subscriber station, according to the embodiments of the present disclosure. At this time, one of Equation 1 to Equation 4 is used according to the embodiments of the present disclosure.

The controller 1408 controls encryption of data that will be used during communication of the member base stations in the cell of the subscriber station. According to the embodiments of the present disclosure, the data is encrypted by using the security key for the cooperative communication of the serving base station or the security key for the cooperative communication for each of the member base stations. Further, even when the serving base station is changed to the new serving base station, the data may be encrypted by using the security key for the cooperative communication of the new serving base station or the security key for the cooperative communication/the security key for the sub-cooperative communication classified for the member base stations, according to the embodiments of the present disclosure.

Figure 15:
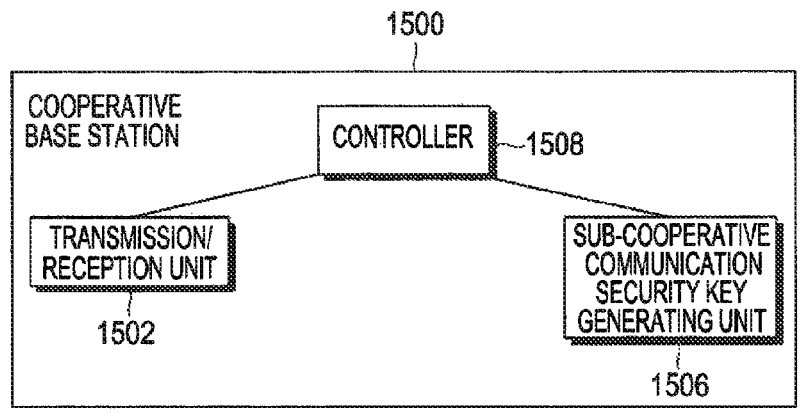
FIG. 15 is a block diagram illustrating a configuration of a cooperative base station according to an embodiment of the present disclosure.

FIG. 15 is a block diagram illustrating a configuration of a cooperative base station according to an embodiment of the present disclosure. While configurations of the cooperative base station are differently illustrated in FIG. 15 according to operations classified by techniques proposed in the present disclosure, the configurations may be configured with a single unit or other sub-units through other embodiments.

Referring to FIG. 15, the cooperative base station 1500 includes a transmission/reception unit 1502, a sub-cooperative communication security key generating unit 1506, and a controller 1508.

The transmission/reception unit 1502 receives a seed or a seed offset from a subscriber station according to the embodiments of the present disclosure. At this time, the seed and the seed offset are set to a value different from that of member base stations, according to the embodiments of the present disclosure. Alternatively, the seed may also be set to a value that all the member base stations commonly use, according to another embodiment. The transmission/reception unit 1502 performs communication in a cell under control of a serving base station. Further, even when the serving base station is changed to a new serving base station, the transmission/reception unit 1502 performs the communication in the cell under control of the new serving base station.

The sub-cooperative communication security key generating unit 1506 generates a security key for sub-cooperative communication of the cooperative base station 1500 by using the seed or the seed offset. At this time, one of Equation 1 to Equation 4 is used according to the embodiments of the present disclosure.

When recognizing a notification informing that the serving base station has been changed to the new serving base station, the controller 1508 performs the communication in the cell, based on the security key for the sub-cooperative communication generated according to the embodiments of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A method to manage a security key to be used for a cooperative communication at a subscriber station in a wireless communication system, the method comprising:
    generating a first input value of a serving base station and a second input value of a member base station for the cooperative communication;

transmitting the first input value to the serving base station, and the second input value to the member base station;

generating a first security key of the serving base station based on the first input value, and a second security key of the member base station based on the second input value;

performing the cooperative communication using the first security key with the serving base station or the member base station; and if a notification indicating that the member base station is changed into a new serving base station, is received, performing the cooperative communication using the second security key with at least one of the new serving base station or the serving base station.

2. The method of claim 1, wherein each of the first input value and the second input value comprises a common value and an offset set to a different value for each of the first input value and the second input value.

3. The method of claim 1, further comprising:

receiving, form the serving base station, a message indicating that a new base station performing the cooperative communication is added;

generating a new value for the new base station; and transmitting, to the new base station, the new value.

4. The method of claim 1, wherein performing the cooperative communication using the second security key comprises:

transmitting data encrypted using the second security key to the member base station or the serving base station; and receiving, from the member base station or the serving base station, other data encrypted using the second security key.

5. The method of claim 1, wherein the first input value is different from the second input value.

6. A method to manage a security key to be used for a cooperative communication at a serving base station in a wireless communication system, the method comprising:

receiving, from a subscriber station, a first input value of the serving base station;

generating a first security key of the serving base station based on the first input value;

performing the cooperative communication using the first security key with the subscriber station or a member base station;

determining a change of the member base station into a new serving base station;

transmitting, to each of the subscriber station and the member base station, a notification indicating that the member base station is changed into the new serving base station; and performing the cooperative communication using a second security key of the member base station with the subscriber station or the member base station, wherein the second security key is generated based on a second input value generated corresponding to the member base station by the subscriber station.

7. The method of claim 6, wherein the first input value is different from the second input value.

8. The method of claim 6, further comprising:

determining adding of a new base station for the cooperative communication; and performing a procedure for a cell member negotiation with the new base station.

9. A subscriber station to manage a security key to be used for a cooperative communication in a wireless communication system, the subscriber station comprising:

a controller configured to:

generate, a first input value of a serving base station and a second input value of a member base station for the cooperative communication;

control a transceiver to transmit the first input value to the serving base station and the second input value to the member base station; and generate a first security key of a serving base station based on the first input value and a second security key of the member base station based on the second input value; and the transceiver configured to:

perform the cooperative communication using the first security key with at least one of the serving base station or the member base station; and if a notification indicating that the member base station is changed into a new serving base station is received, perform the cooperative communication using the second security key with at least one of the new serving base station or the serving base station.

10. The subscriber station of claim 9, wherein each of the first input value and the second input value comprises a common value, and wherein an offset is set to a different value for each of the first input value and the second input value.

11. The subscriber station of claim 9, wherein:

the transceiver is further configured to receive, form the serving base station, a message indicating that a new base station performing the cooperative communication is added; and the controller is further configured to:

generate a new input value for the new base station; and control the transceiver to transmit, to the new base station, the new input value.

12. The subscriber station of claim 9, wherein during performing the cooperative communication using the second security key, the transceiver is configured to:

transmit data encrypted using the second security key to the member base station or the serving base station; and receive, from the member base station or the serving base station, other data encrypted using the second security key.

13. The subscriber station of claim 9, wherein the first input value is different from the second input value.

14. A serving base station to manage a security key to be used for a cooperative communication in a wireless communication system, the serving base station comprising:

a transceiver configured to receive, from a subscriber station, a first input value of the serving base station; and a controller configured to:

generate a first security key based on the first input value of the serving base station;

control the transceiver to perform the cooperative communication using the first security key with the subscriber station or a member base station;

determine a change of the member base station into a new serving base station;

control the transceiver to transmit, to each of the subscriber station and the member base station, a notification indicating that the member base station is changed into the new serving base station; and control the transceiver to perform the cooperative communication using a second security key of the member base station with the subscriber station or the member base station, wherein the second security key is generated based on a second input value generated corresponding to the member base station by the subscriber station.

15. The serving base station of claim 14, wherein the first input value is different from the second input value.

16. The serving base station of claim 14, wherein the controller is further configured to:
determine adding of a new base station for the cooperative communication; and
control the transceiver to perform a procedure for a cell member negotiation with the new base station.

17. A method to manage a security key to be used for a cooperative communication at a member base station in a wireless communication system, the method comprising:
receiving, from a subscriber station, a first input value of the member base station, and generating a first security key based on the first input value;
performing the cooperative communication using a second security key of a serving base station with the subscriber station based on controlling of the serving base station; and
receiving, from a serving base station, a notification indicating that the member base station is changed into a new serving base station, and performing the cooperative communication using the first security key with the subscriber station, wherein the second security key is generated based on a second input value generated corresponding to the serving base station by the subscriber station.

18. The method of claim 17, wherein the first input value is different from the second input value.

19. The method of claim 17, wherein performing the cooperative communication using the first security key comprises:
transmitting data encrypted using the first security key to at least one of the serving base station or the subscriber station; and
receiving, from the subscriber station or the serving base station, other data encrypted using the first security key.

20. A member base station to manage a security key to be used for a cooperative communication in a wireless communication system, the member base station comprising:
a transceiver configured to:
receive, from a subscriber station, a first input value of the member base station; and
generate a first security key based on the first input value; and
a controller configured to:
control the transceiver to perform the cooperative communication using a second security key of a serving base station with the subscriber station based on controlling of the serving base station;
control the transceiver to receive, from a serving base station, a notification indicating that the member base station is changed to a new serving base station; and
perform the cooperative communication using the first security key with the subscriber station, wherein the second security key is generated using on a second input value generated corresponding to the serving base station by the subscriber station.

21. The member base station of claim 20, wherein the first input value is different from the second input value.

22. The member base station of claim 20, wherein the transceiver is further configured to:
transmit data encrypted using the first security key to the serving base station or the subscriber station; and
receive, from the subscriber station or the serving base station, other data encrypted using the first security key.

* * * * *